United States Patent [19]

Palm et al.

[11] Patent Number: 4,699,079
[45] Date of Patent: Oct. 13, 1987

[54] TONER MODULES FOR ELECTROPHOTOGRAPHIC PRINT ENGINE

[75] Inventors: Charles S. Palm, Norcross; Danny L. Slayton, Lilburn; Khosrow Lak; Peter F. Sampson, both of Doraville; David R. Davis, Buford; Maurice S. Wheatley, Jr., Duluth; Gregory A. Chatham, Marietta; Wayne C. Jones, Duluth; Kirk W. Charles, Atlanta, all of Ga.; Anthony J. Ireland, El Cerrito, Calif.

[73] Assignee: Colorocs Corporation, Norcross, Ga.

[21] Appl. No.: 932,407

[22] Filed: Nov. 19, 1986

Related U.S. Application Data

[62] Division of Ser. No. 791,218, Oct. 25, 1985, Pat. No. 4,652,115.

[51] Int. Cl.⁴ ............................................. G03G 15/09
[52] U.S. Cl. .................................. 118/658; 355/3 DD
[58] Field of Search ............ 355/3 DD; 118/657, 658; 430/122

[56] References Cited

U.S. PATENT DOCUMENTS

| | | | |
|---|---|---|---|
| 3,841,751 | 10/1974 | Draugelis et al. | 355/4 |
| 4,014,291 | 3/1977 | Davis | 118/657 |
| 4,081,571 | 3/1978 | Nishihama et al. | 355/3 DD |
| 4,147,541 | 4/1979 | Lindblad et al. | 427/14 X |
| 4,170,195 | 10/1979 | Schön | 118/658 |
| 4,292,924 | 10/1981 | Lindblad et al. | 118/658 |
| 4,295,442 | 10/1981 | Thaxter | 118/657 |
| 4,418,643 | 12/1983 | Barto et al. | 118/657 |
| 4,459,345 | 7/1984 | Probst | 430/122 |

Primary Examiner—R. L. Moses
Attorney, Agent, or Firm—Jones, Askew & Lunsford

[57] ABSTRACT

An improved full color electrophotographic print engine using flexible belts to carry a photosensitive electrostatic image developer and a transfer belt for building up composite developed images. Each belt, and an optical scanner, are driven by mechanically independent motors which are synchronized by an electronic digital controller implementing precise servos. The use of the flexible belts allows the machine to be relatively inexpensive, very small compared to previous full color print engines, and yet maintain precise registration of color composite images. An improved fuser mechanism with increased dwell time at constant machine speed is also shown. The fuser includes a pair of spaced-apart rollers, both of which urge a sheet of image receptor against the heated roller over a predetermined angular portion of the roller. The machine is specifically designed to be used interchangeably with an optical bench source as a copier or with a laser bench as a laser printer. Improved copy quality monitoring by sensing actual amounts of toner deposited on a photoreceptor belt is also shown. Also, improved downwardly facing gravity-fed toner deposition modules are shown including an embodiment which has a purely magnetic gate for opening and closing the toner supply.

14 Claims, 22 Drawing Figures

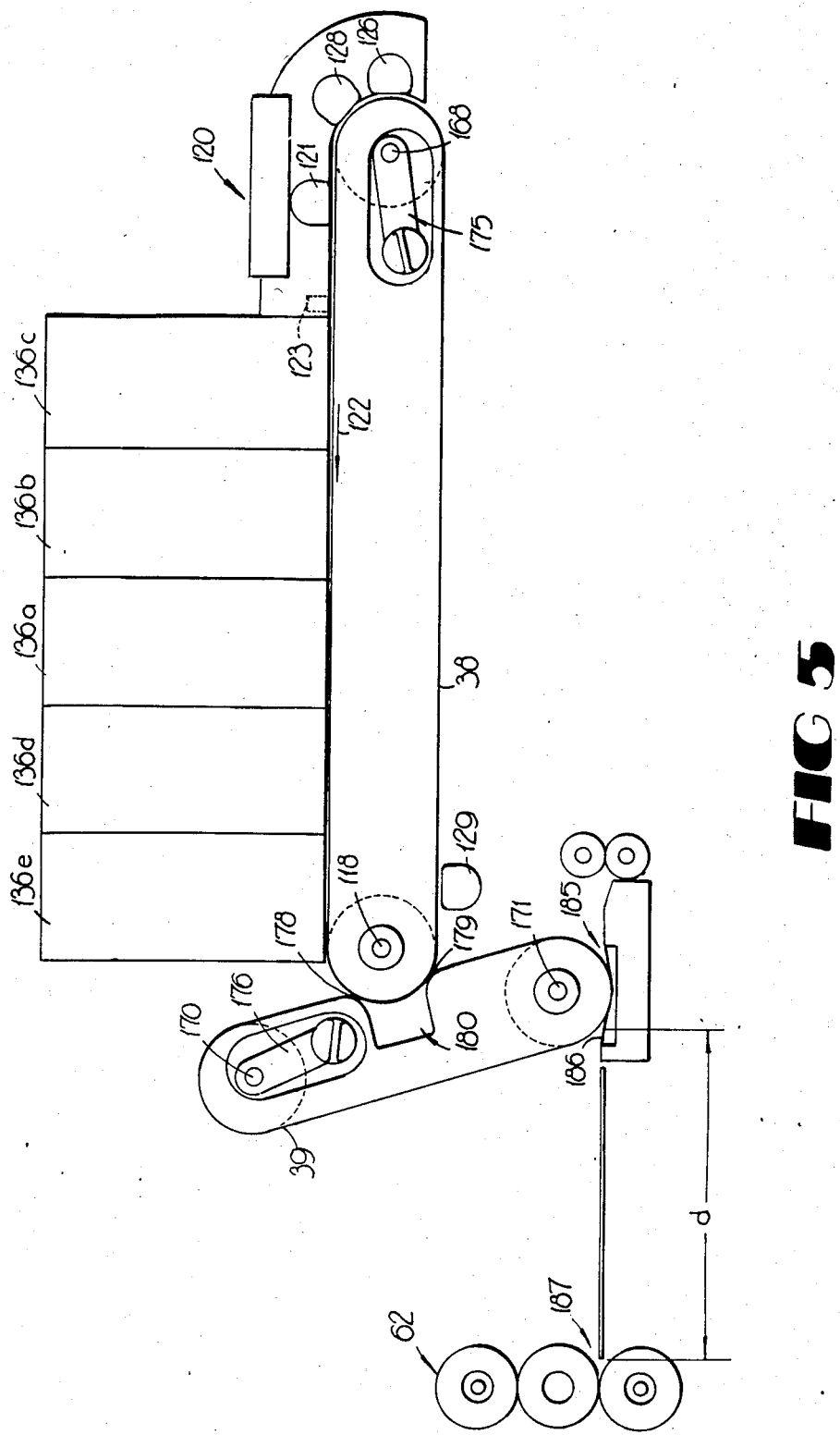

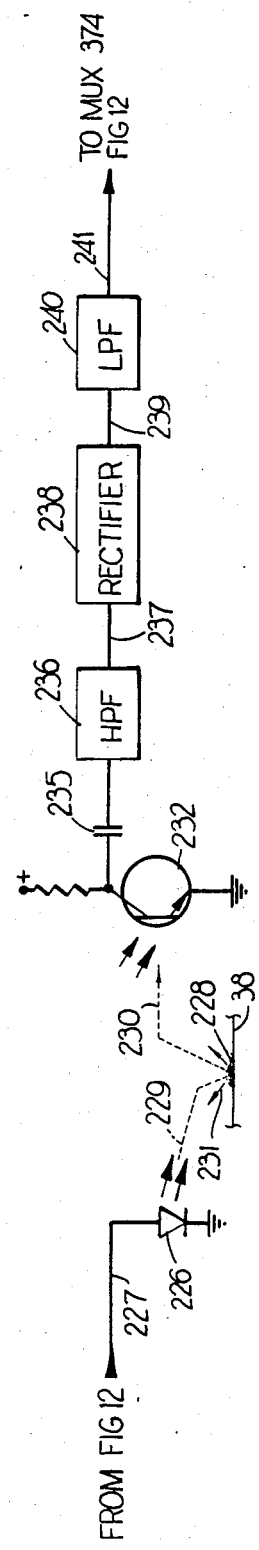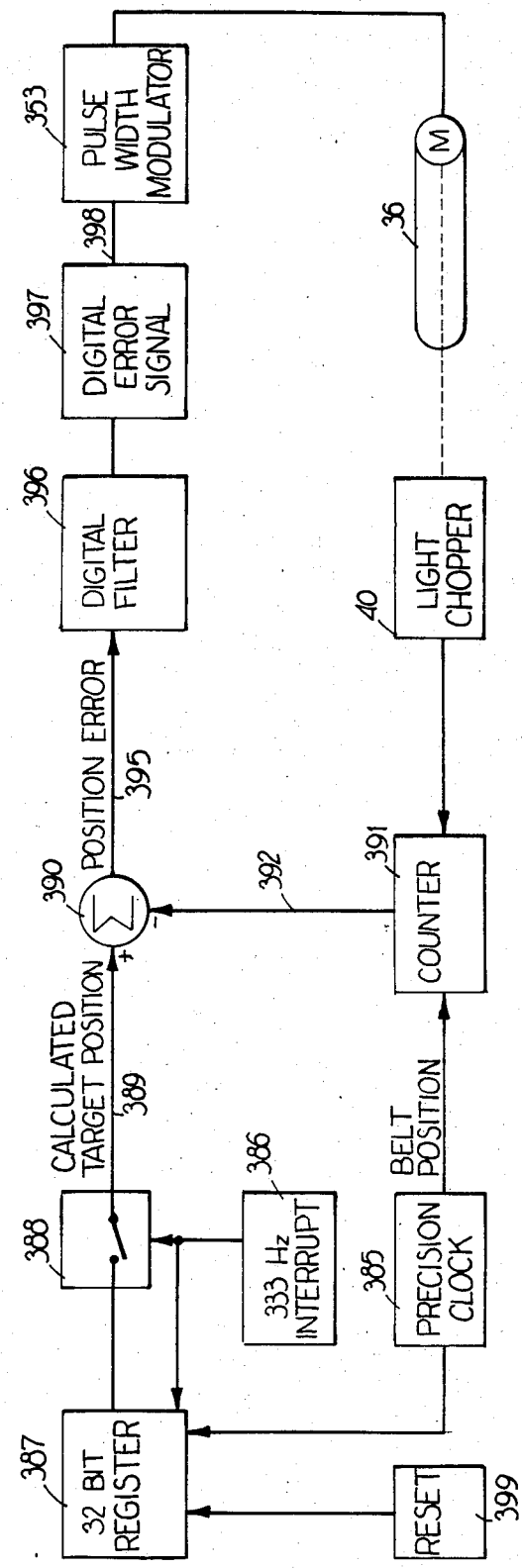

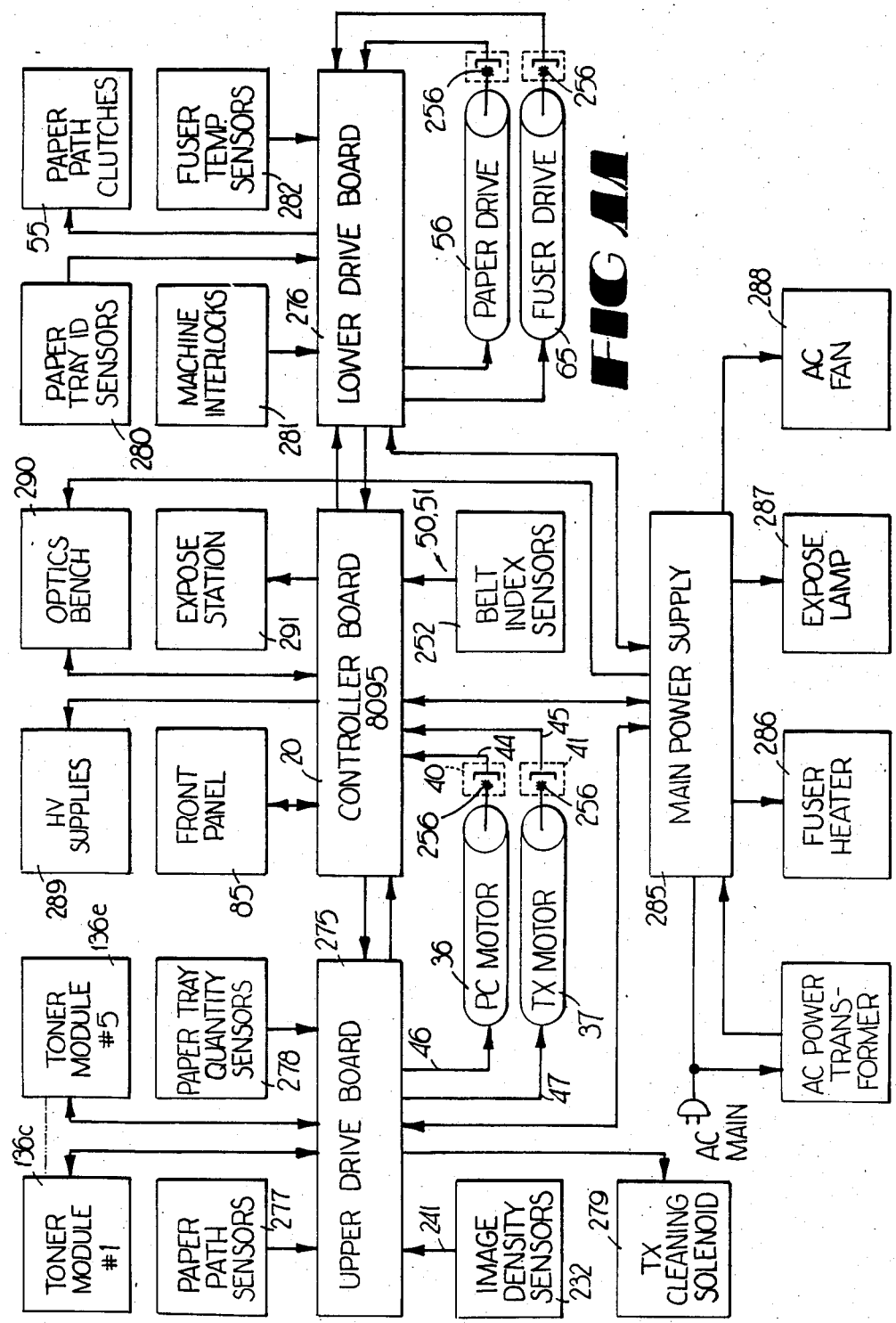

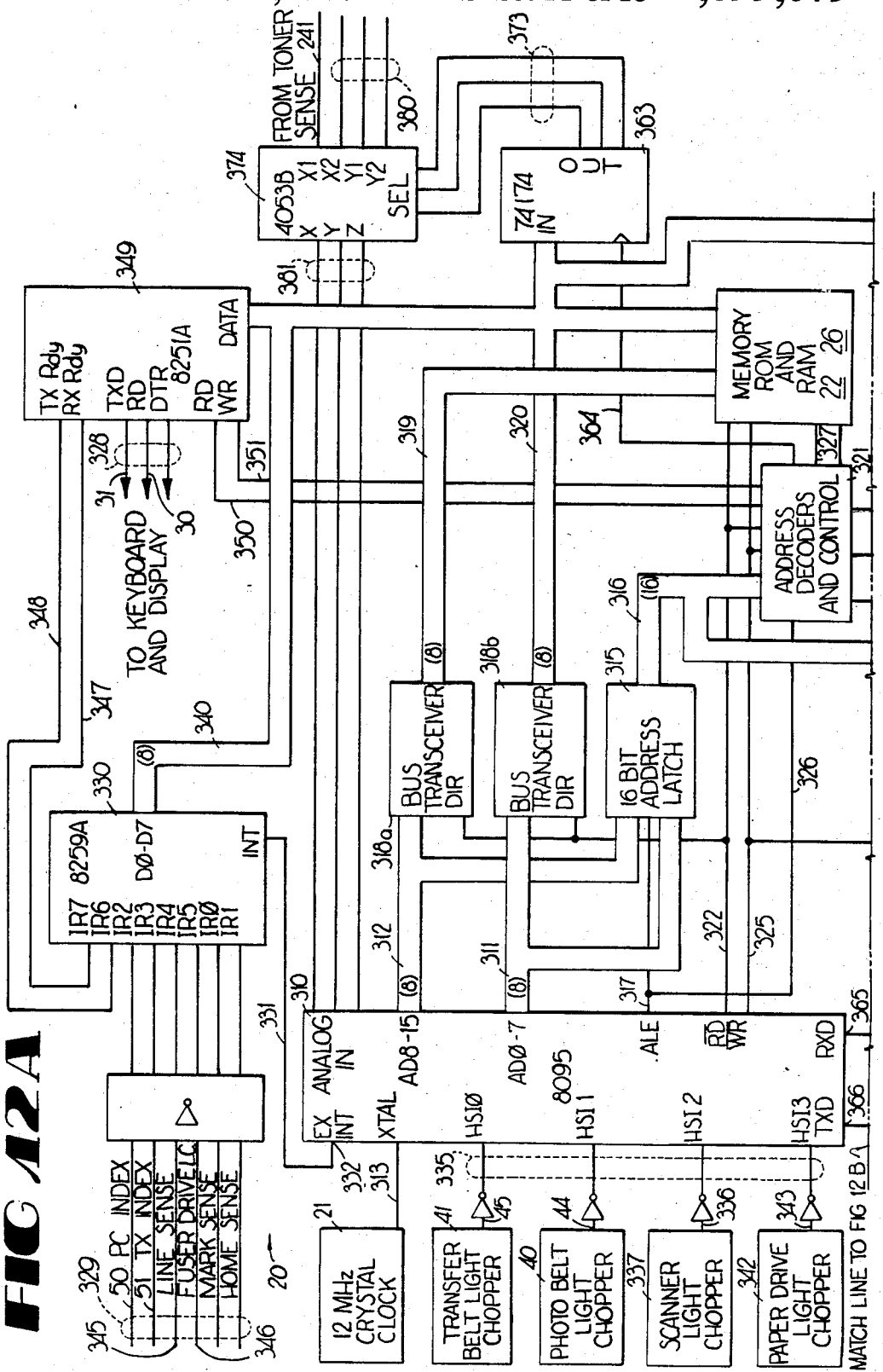

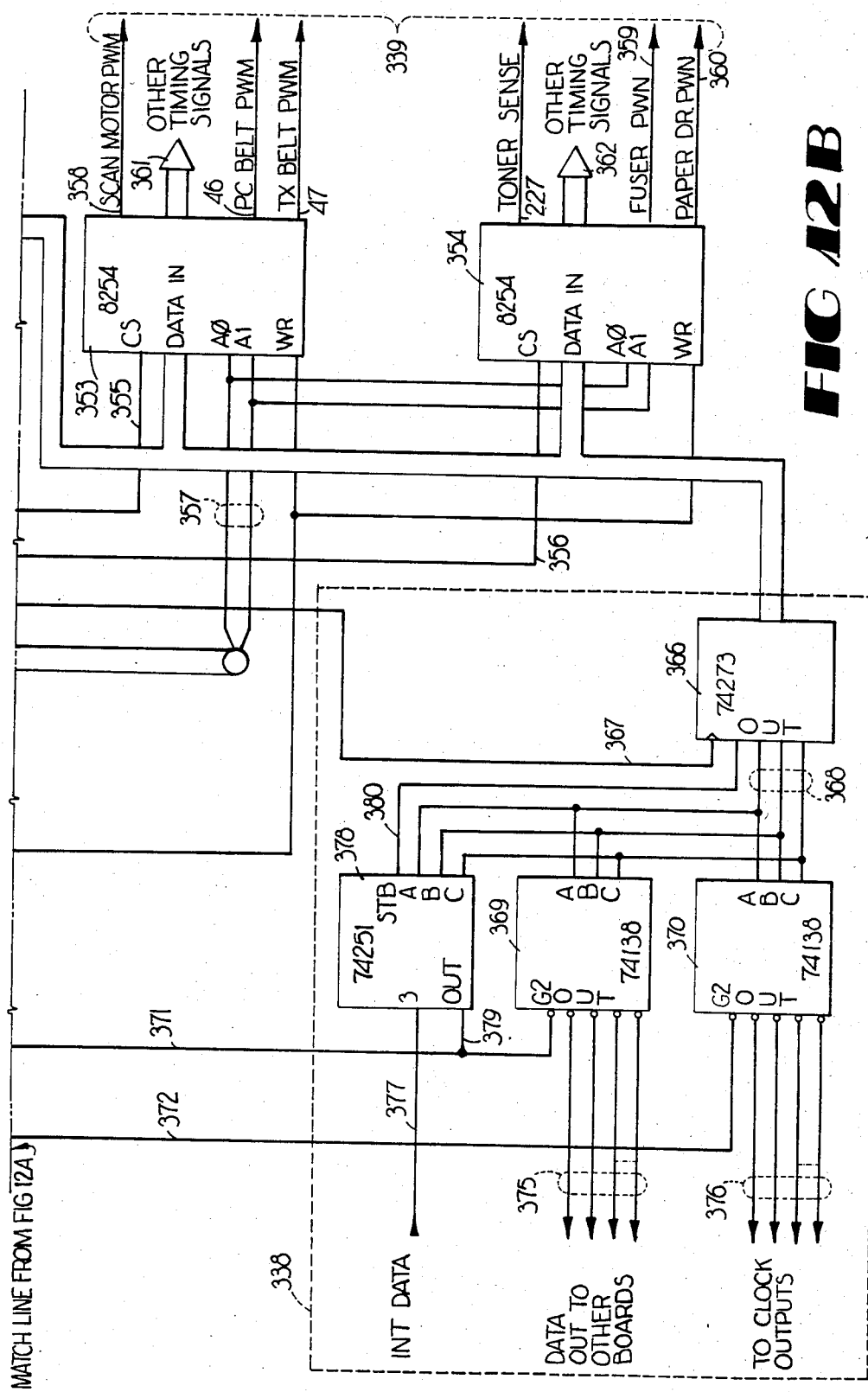

TONER MODULES FOR ELECTROPHOTOGRAPHIC PRINT ENGINE

CROSS REFERENCE TO RELATED APPLICATION

This application is a division of application Ser. No. 791,218 filed Oct. 25, 1985, entitled "IMPROVED PRINT ENGINE FOR COLOR ELECTROPHOTOGRAPHY".

TECHNICAL FIELD

The present invention relates to print engines for color electrophotography and, in particular, is an improved mechanism having a plurality of individual mechanical subsystems which are driven independently by an electronic controller which synchronizes operation of the independent subsystems. The present invention also includes an improved fuser and print color monitoring systems.

BACKGROUND OF THE INVENTION

Electrophotography has become one of the most widely used systems in the field of information processing in this century. In particular, dry copying, also known as xerography, has become a standard process for creating copies of documents in a host of environments including offices, educational institutions and the like. The basics of xerography are well known to those skilled in the art.

The fundamental elements of a xerographic copier include a photosensitive medium which is charged with an electrostatic charge of predetermined polarity. An optical image of an original to be copied is focused onto the electrostatic medium, either at one time through the use of a stroboscopic flash and appropriate optics, or by a linear scan which moves either the light source, optical elements in the optical path, or both, in synchronism to scan the photosensitive medium with the image of the original.

Portions of the originally uniform electrostatic charge on the surface of the photoreceptor are conducted away from the areas of the photoreceptor which were illuminated, and thus an electrostatic image of the original is left on the photoreceptor. In most modern xerographic copying systems, this image is passed over a source of toner materials electrostatically held to ferromagnetic carriers. The ferromagnetic carriers are used to allow magnetic fields to bring the materials into contact with the above-mentioned electrostatic image.

The electrostatic charge which remains on portions of the electrostatic image has a sufficiently strong electrostatic force to pull the toner materials away from the carriers and to hold them in place on the appropriate portions of the electrostatic image. The magnetic forces associated with the toner modules carry the ferromagnetic carrier particles back to a position where they are remixed with additional toner.

As is known to those skilled in the art, the toner materials are normally plastics which melts at a predetermined temperature and have appropriate color characteristics once they are melted.

The charged photoreceptor which now carries toner on the portion of the photoreceptor which was not discharged in response to light when the electrostatic image was originally created, is referred to herein as a developed image. Subsequently, the photoreceptor carrying the developed image is brought into contact with an image receptor which, in the most common applications of xerography, is a sheet of paper. Electrostatic charging techniques are used to transfer the toner from the photoreceptor to the image receptor.

Once this is accomplished, the image receptor is passed through a device, commonly referred to as a fuser, which is a station in the path for the image receptor at which the transferred toner is heated to fix the image onto the image receptor. By this process, a monochrome copy of the original image which was exposed onto the surface of the photoreceptor is made.

In more recent years, systems for color electrophotography have been created. In many respects, the process of color electrophotography is analogous to standard three-color printing processes used in the more conventional printing arts. Conventional three-color printing color component images, commonly referred to as color separations, are created by photographing the original through appropriate filters. Each of the separations is in turn made into a separate printing plate. During the printing process, each plate is inked with an appropriate color determined by the filter used in making the original separation. The printing press can be adjusted so that proper registration, aligning each separate color component image over the other is accomplished. Once the press is properly adjusted, multiple copies of the original color image may be faithfully reproduced.

Prior art color electrophotography machines have used a conceptually similar process. Most full color dry copiers use three process colors to recreate (within the color limits of available toner materials) any color in the spectrum. Three color component images are shot through three separate filters in a manner analogous to the creation of color separations in color printing. Each image is developed with a toner having the appropriate color characteristics, and each developed color component image is in turn transferred to the image receptor or paper, one on top of the other, to provide a composite image. The paper carrying the composite image is then passed through a fuser in a conventional manner.

It is known in the art of color xerography to include an intermediate transfer medium between the above-described photoreceptor, upon which each individual color component image is developed, and the ultimate image receptor or paper. In this specification, such an intermediate transfer medium is referred to as a transfer medium. In this type of device, a composite developed image is built up, one color component image at a time, until an overlaid composite color image, having portions of all three of the color component toners thereon, is created on the transfer medium. Once this is accomplished, the composite image on the transfer medium is transferred to the paper which then passes through the fuser in the normal fashion.

As noted above, color xerography is conceptually quite similar to conventional color printing. However, there is a significant difference in the economics of scale. Most importantly, color printing is rarely undertaken for small numbers of copies. In practical environments, the color printer normally has ample opportunity to make sure that elements of the press are properly aligned so that proper registration is obtained. In the absence of proper registration, the individual color component images are misaligned and the result is a fuzzy image, with edges of objects being outlined inappropriately with portions of one of the color components. In color xerography, there is no ability by the user (nor the time) to make precise adjustments, since often one or two copies are all that are being made at any one time.

Therefore, in prior art color photocopying machines, the mechanical elements carrying the photoreceptor medium, the intermediate transfer medium (if used) and the paper have had to be machined to extremely close tolerances in order to maintain proper registration. In the prior art, this has only been practical by using relatively large drums to carry the photoreceptor and critically machined, and therefore expensive, gearing arrangements by which the entire mechanism is driven from a common prime mover. Naturally, as these mechanical components age and the mechanical elements controlling registration suffer wear, registration, and therefore copy quality can, and does suffer significantly. Therefore, maintenance of critical mechanical alignments in prior art full color electrophotographic systems have been one of the principal factors in keeping the costs of such machines very high with respect to the cost of monochrome copiers.

Additionally, it is well known to those skilled in the art that light sources of considerable intensity are needed in full color electrophotographic printing since, during the shooting of each color component image, a significant fraction of light from a white light source is blocked by the separation filters interposed in the optical path between the original and the photoreceptor. This, together with the power requirements of the conventional fuser mechanism and the electric motors to operate the above-referenced large mechanical drums, created a state of the prior art in which no full color copier known to the inventors of the present invention has ever been designed which can operate reliably from a conventional fifteen or twenty ampere 120 volt branch circuit.

Also, because of the use of finely machined parts and high power requirements, the prior art has heretofore not produced a practical full color copier which is of a size substantially equivalent to conventional table top monochrome copiers.

As is also known to those skilled in the art, conventional full color photocopying machines will output copies at approximately ⅓ the rate of an equivalent monochrome machine since three separate images must be developed for each copy. Additionally, all prior art full color copiers known to the inventors of the present invention have copied monochrome (black and white) originals by use of the standard color copying process. This is known in the art as creating a copy that is "process black". This refers to the fact that in conventional full color copiers, three separate substantially identical images are created when the machine is copying a black and white original. Each of these images is developed with a separate color component toner and the composite image is fused. If the toner color characteristics are right, and registration within the machine is adjusted properly, the resultant copy will approximate the black and white original.

However, it is well known to those skilled in the art that process black from color copying machines does not produce as sharp an image as conventional black and white copies made on monochrome xerographic machines using a single color black toner. Additionally, because three separate images are shot, even to copy a black and white original, the copy output rate for conventional full color copies has been too slow to encourage the user to make use of such a machine as a general purpose office copier.

The combination of the slower copying rate (due to creation of three separate images) and the lower copy quality of process black monochrome copies has made prior art full color copiers impractical for use as general purposes office copying machines. Therefore, prior art full color copiers have been limited to a specialized set of applications for which full color copies are needed on a regular basis, and the volume of such copies will justify the high cost of a full color copying machine. Virtually all such applications for prior art full color copying machines have been in environments which require the user to purchase or lease an additional monochrome copier to do more conventional black and white copying.

It is also known to those skilled in the art for any given toner material, or set of toner materials in the case of a color copier, a certain amount of heat per unit area must be transferred to the image receptor or paper carrying the toner in order to properly melt the plastic and fuse the image on the copy. The heat transfer is determined by a combination of the temperature on a rotating surface of the fuser which contacts the toner material, and the dwell time of the copy in the fuser. The dwell time is the time any given point on a particular copy is in contact with a heated surface within the fuser.

Conventional fusers are normally formed from a roller having a heated compressible surface and a compression roller which is urged against the heated compressible surface. The paper bearing the developed image of toner is passed between the heated roller and the compression roller. Since the compression roller deforms the compressible heated surface to some degree, there is a predetermined length along the path of travel of the paper for which the paper is in contact with the compressible surface of the heated roller. Therefore, dwell time may also be expressed as the product of the path length along the compressible surface of the heated roller for which the compression roller causes the copy to contact the compressible surface, times the linear rate of travel of the copy through the fuser mechanism.

As is known to those skilled in the art, the process of fusing a developed toner image onto the paper, or other image receptor, is often the rate limiting step in the copying process which limits the total copy per unit time output of a copying machine. As toners requiring greater amounts of heat for fusing become used, the only choices available to the designer are to increase the distance along the compressible surface of a heated roller for which the image receptor is in contact with the surface, to elevate the surface temperature of the heated roller in the fuser, or to slow down the rate of travel of the paper through the fuser.

Naturally, there is a practical upper limit to the temperature which can be maintained on the heated surface of a fuser in order to prevent the image receptor from catching fire or being scorched (in the case of paper) or melting (in the case of plastic transparencies), and also there is an upper temperature limit at which toner materials will have their color characteristics altered.

In conventional color copiers, all mechanical drive devices have been operated by a common prime mover in a manner which was mechanically synchronized. Therefore, the rate of travel of the image receptor bearing a developed full color image through the fuser mechanism has been substantially equal to the linear rate of movement of the image bearing surfaces within the machine. For example, the rate of travel of paper through the fuser in a conventional color copier has been equal to the rate of travel of the photoreceptor bearing the electrostatic image past the source of toner material. This has led to a trade-off in the design of such machines which requires that either the fuser temperature be elevated, thus increasing the power requirements of the machine, or that the entire operating speed of the machine be slowed down in order to provide sufficient dwell time for the copy within the fuser.

Prior art color electrophotographic print engines have had toner deposition modules which faced upward. In other words, the path from the toner and carrier reservoir to a decorator roll, which eventually carries the toner to the photoreceptor belt, was pointed upwardly, either vertically or in a direction with a predominant vertical component. It is believed that the conventional wisdom of those skilled in color electrophotography indicated that a plurality of color process toners could not be arranged in downwardly facing toner deposition modules in a practical machine.

One problem which exists in prior art color electrophotographic print engines is cross contamination of the color toners when a phenomenon known as carrier pull occurs. Carrier pull results from a condition of unusually high static charge on the photoreceptor. This normally occurs in response to a malfunction of one of the coronas which applies charge to the photoreceptor. The phenomenon of carrier pull is characterized by very strong electrostatic force between the highly charged portion of the photoreceptor and the toner particles on the portion of a decorator roller under the photoreceptor. These forces are so strong, that they pull large clumps of toner and its carrier particles off the decorator rollers onto the highly charged portion of the photoreceptor. As the photoreceptor continues to move, mechanical vibration can shake the particles loose where they will fall onto the decorator roller of a downstream toner module of another color. Note that this results, in large part, because the toner deposition modules are upwardly facing and the force of gravity tends to pull the excessive toner off the photoreceptor down onto the decorator rollers which become contaminated.

Also, when the phenomenon of carrier pull occurs, the magnetic particles which have been pulled off onto the photoreceptor tend to be attracted to the magnets of downstream decorator rolls. The combined influence of gravity and the magnets of the downstream decorator rolls which pull the carrier particles, and thus some of the color toner particles in the immediate vicinity, onto the other decorator rolls is another mechanism which causes contamination of other toner modules in the presence of carrier pull.

As is also known to those skilled in the art, the basic technology applied to xerographic copying has been applied more recently to devices known as laser printers. Conceptually, the print engine in a laser printer is substantially identical to the print engine used in xerographic copying machines. The fundamental difference between the two is the source of the image to be printed. In the case of a copier, an original is illuminated by a high-intensity light and the image from the illuminated original is focused onto the photoreceptor. In the case of a laser printer, control circuitry is used to turn a laser beam on and off as it sweeps a raster pattern over the surface of the photoreceptor to directly create the image to be reproduced. As the complexity of images to be created by the laser printer increases, and the pixel resolution increases, the computational power and memory requirements for circuitry associated with controlling the laser beam also increase. However, once the above-referenced electrostatic image is created on the photoreceptor, the principle of operation of a laser printer and a xerographic copier are identical. Color laser printing is accomplished in a manner analogous to color copying by computing a color value for each pixel and a relative intensity of the laser beam for each color component of the pixel color and creating three separate images, as described hereinabove.

The foregoing description is, to the best of the knowledge of the inventors of the present invention, an accurate description of the state of the art for color electrophotography prior to the invention of the present invention. From the foregoing it will be appreciated that the prior art has not produced a mechanism for a full color print engine which may be used in either a photocopying machine or a laser printer, which may be practically housed in an enclosure which is substantially the same size as conventional table-top convenience monochrome copiers. Furthermore, the prior art has not produced a full color print engine which will maintain the critical registration necessary to produce accurate full color copies by overlaying separate color component images without the use of relatively expensive finely machined mechanical parts. Additionally, the prior art has failed to produce a full color photocopying machine which will practically serve as a standard copier in most office environments by producing monochrome copies at either an adequate rate, or with acceptable copy quality for high volume monochrome copying. The latter limitation has been due to the substandard quality of process black as compared with conventional monochrome copiers using black toner. Also, the prior art has been unable to produce a practical full color photocopying machine for which the power consumption of the machine is controlled so that it may be operated from a conventional 120 volt 15 or 20 amp branch circuit.

SUMMARY OF THE PRESENT INVENTION

The present invention overcomes the above stated technical problems in the prior art in a number of significant aspects. Broadly stated, the present invention provides a full color print engine for an electrophotographic process which includes a conventional photoreceptor for developing color component images and an intermediate transfer medium for developing a composite image. Broadly stated, the present invention implements these two elements with non-critically machined surfaces, and employs a novel electronic control arrangement to synchronize the relative movements of these mechanical parts.

In the preferred form of the present invention, the photoreceptor and the intermediate transfer medium are both carried on flexible belts. Each belt is independently driven by a direct current electric motor. Light chopper motion transducers are used to detect and quantify movement of the belts and the passage of an index mark on each belt past a predetermined reference point is also detected. The present invention employs a precision digital electronic controller for synchronizing the mechanical movements of the two belts to assure proper registration of the color component images when the composite image is formed.

It is an important aspect of the preferred form of the present invention that the controller not only synchronize the movements of these two belts, but also that it continuously adjusts for slight deviations in the lengths of the belts from their optimum lengths in order to maintain proper registration. In the present invention, the length of one of the belts is nominally an integer submultiple of the length of the other. In the preferred embodiment, the belt carrying the photoreceptor is normally twice the length of the intermediate transfer belt. However, it should be understood that as used in the specification, the concept of an integer submultiple includes a value of one wherein the belts are nominally of the same length.

In the preferred form of the present invention, an additional novel mechanism is used for maintaining proper registration between the photoreceptor belt and the intermediate transfer belt. In a preferred embodiment of the present invention, the photoreceptor belt rotates about two rollers with relatively small radii compared to the overall belt length. The intermediate transfer belt is positioned to partially wrap around one of these rollers at the point where the two belts contact. This provides a surface area, preferably in excess of one-half inch along the direction of travel of the belts, at which the two belts are in intimate contact while the color component images from the photoreceptor are being transferred to the intermediate belt. By proper selection of surface charge density and polarity, very strong electrostatic attractive forces are created between the two belts which aids in maintaining proper registration during the image transfer.

According to another aspect of the present invention, an electrophotographic print engine is created which is usable in a xerographic copying machine which can function as both a general purpose monochrome office copier and a full color copier. The present invention overcomes the above-cited drawbacks of the prior art by employing a fourth toner which is a conventional black monochrome toner. A user selectable input to select monochrome copying is provided. Therefore, the present invention will provide high quality black and white copies without the drawbacks of copies made using process black, described above.

In addition to the higher quality monochrome copies obtained using a dedicated black toner rather than process black, the controller for the present invention shoots only the single required image when making monochrome copies. Therefore, the present invention has a copy output rate for monochrome copies which is approximately three times greater than its output rate for color copies, unlike conventional color copiers which use process black for copying monochrome originals. According to this aspect of the present invention, the single developed image using the black toner is immediately transferred to the intermediate transfer belt and onto the paper when the device is in a monochrome mode of operation.

In the most preferred form of the present invention, a fifth toner module is also used which was designed to carry a color specific toner for a custom color which cannot be adequately reproduced using the three color process toners.

Another novel and advantageous aspect of the present invention is the employment of independent drive mechanisms for the fuser and the image formation elements. In the preferred embodiment, the paper path includes a space, between the station at which a composite image from the intermediate transfer belt is transferred onto to the paper and the fuser, which is of sufficient length to hold a sheet of the most commonly used length of paper. Therefore, a complete composite image is transferred on to the sheet of paper carrying the copy before the forward end of the sheet enters the fuser. In the preferred form, the paper carrying the developed composite image is driven through the fuser at a slower rate than the machine rate at which developed images are being transferred from the photoreceptor to the intermediate transfer belt. Since, during full color copying, three separate images must be shot and developed before composite image is transferred to a sheet of paper, the speed through the fuser may be lowered to as much as $\frac{1}{3}$ of the above-referenced machine speed in embodiments of the present invention. This provides an advantageous mechanism for increasing the dwell time of the copy in the fuser without slowing down the overall copying rate.

According to yet another aspect of the present invention, the controller for a print engine embodying the present invention controls the maximum power drawn by the machine during operation. This allows embodiments of the present invention to be constructed which may be dependably operated from a conventional 15 amp 120 volt branch circuit so that the user of the present invention does not have to suffer the expense of installing special branch circuits in the environment in which the print engine is used.

According to another aspect of the present invention, an improved fuser is provided which increases the dwell time of the image receptor in the fuser mechanism without slowing down operation of the fuser or increasing the fuser temperature. The improved fuser of the present invention includes at least two compression rollers for urging the image receptor against the compressible heated surface of the fuser and thus effectively doubles the dwell time without affecting other operating parameters. The preferred form of the improved fuser includes means for urging the copy against the heated roller of the fuser so that it dependably feeds the paper from the position where it exits the station at which the first compression roller and the heated roller are urged together and enters the station at which the second compression roller and the heated roller make contact.

Yet another improvement of the present invention is an improved copy quality monitoring system. As is known to those skilled in the art, a number of environmental variables affect the operation of electrophotographic print engines, particularly humidity and temperature. In the presence of a relatively high humidity, the air includes a lot of hydrated ion carriers which can have the effect of discharging the electrostatic potential applied to the photoreceptor belt. This in turn affects the amount of toner transferred to the photoreceptor during the development process. Similar effects will be observed in the transfer from the photoreceptor belt to the intermediate transfer belt.

The print quality monitoring system of the present invention includes two major subsystems: an electrostatic monitoring and toner deposition monitoring. The first element of the system is provision of a reference standard for creating a reference image segment on the photoreceptor belt. In embodiments of the present invention used in photocopiers, a set of standard color component bars are provided slightly to one side of the platen glass for holding originals to be copied, and on the interior of the machine. These are aligned within the optical path of the optics of the system so that when a scan of an original is made to create an electrostatic image on the photoreceptor belt, the color bars may also be selectively scanned to form an image on the belt. A non-contact electrostatic volt meter is disposed over the photoreceptor belt. The controller for the present invention keeps track of movement of the portion of the belt carrying the image of the color reference bar. When the image of this bar passes under the non-contact electrostatic volt meter, a reading of the volt meter is made.

The electrostatic voltage which should on this portion of the belt is a known calibration quantity. If the electrostatic volt meter detects a voltage on this portion of the belt which is outside an acceptable range, a processor within the controller addresses a look-up table and determines an appropriate change to be made in the input voltage to the corona charging the photoreceptor belt. In this manner, environmental effects which may alter the electrostatic characteristics of the photoreceptor belt are offset.

The second subsystem of the print quality control apparatus is a system for monitoring the depth of toner deposition. When print quality monitoring is taking place, the controller again tracks movement of the portion of the photoreceptor belt carrying the electrostatic image. This image is developed as the belt passes the active toner station (which carries the color of toner corresponding to the color of the color reference bar used in creating the image) and is developed in a normal manner. The developed reference image then passes over an optical scanner, the output of which is read as the developed reference image passes it.

The optical scanner of the preferred embodiment uses an infrared light-emitting diode in conjunction with a phototransistor for detecting light from the LED which is reflected back from an adjacent surface, in this case, the photoreceptor belt carrying the toner of the developed reference image. A standard table is provided in read only memory which correlates the voltage at the output of the optical detector with the proper amount of toner of the particular process color of the referenced image which should be present to properly develop the reference image. Again, if inadequate toner is detected, either the corona voltage may be adjusted or it may be an indication that the supply of toner is low or not operating properly.

The preferred form of the toner deposition detector in the present invention modulates the LED at a particular predetermined frequency and filters and rectifies the output of the optical detector in order to offset the effects of ambient temperature on the infrared photodetector to assure that the optical detector is accurately reading only light reflected from the light-emitting diode.

A similar arrangement for detecting toner deposition on the intermediate transfer belt is used to test for the percent of toner transferred from the photoreceptor to the intermediate transfer belt. If the percentage of transfer changes, alterations to the surface charge of the transfer belt may be made to improve the transfer characteristics.

Additionally, the present invention includes a plurality of gravity fed toner modules of novel design. The toner module of the present invention regulates the thickness of toner/carrier which passes out of the toner module over the photoreceptor belt so that toner does not fall onto the photoreceptor belt under the influence of gravity.

Additionally, the present invention provides a color print engine which is specifically designed to be interfaced to a plurality of image source subassemblies including a photocopier source subassembly and a laser printer source subassembly. In order to achieve this, the present invention provides a conventional serial RS232 to interface connection between the print engine and the particular subassembly selected. In copiers embodying the present invention, the serial interface is connected to a keyboard for providing user selectable inputs. Additionally, an interface is provided from the print engine of the present invention to provide digital information to a copier subassembly about the position of the photoreceptor belt and signals which are appropriate for controlling the optical sweep of an original. The same digital interface is also connected to a laser printer image source subassembly for appropriately synchronizing the raster scan of the laser and movement of the photoreceptor belt. Firmware in read only memories of the print engine controller is also charged when a laser light source, rather than a copier optics bench is used.

The toner modules of the present invention are specifically designed to be downwardly facing and thereby gravity fed. The desire to have a relatively large number of toner modules (five in the preferred embodiment) led to the need to design a practical downwardly facing toner module which could be used in a full color electrophotographic print engine.

In one embodiment of the improved toner modules of the present invention, a conventional decorator roller having a magnetic core of a type known to those skilled in the art is used. A supply of toner materials is placed in a hopper above the mixing chamber. When a sensor within the mixing chamber detects a need for additional toner, a gate is opened and a predetermined amount of toner materials falls under the influence of gravity into the mixing chamber. This eliminates the need for lifting augers commonly found in prior art upwardly facing toner deposition assemblies.

Above the decorator roller is a second and novel mixing roller which is constructed similarly to the decorator roller, in that it has an outer sleeve which rotates around a magnetic core. However, the orientation of the magnetic poles within the core of the mixing roller are arranged such that toner and carrier materials tend to fall off the downward traveling side of the roller and are lifted up off of the upward traveling side of the decorator roller onto the upward traveling side of the mixing roller.

According to a second embodiment of the novel toner modules of the present invention, the magnetic core of the decorator roller is arranged so that it serves a conventional function when in its normal position. Apparatus for rotating the core of the decorator roller through a predetermined angle is provided. When the core is rotated, the combination of the pole configuration in this core and the pole configuration in the core of the mixing roller causes the carrier particles, and thus the toner attached to them, to continue to rotate around the mixing roller and not fall onto the surface of the decorator roller. Additionally, when the core of the decorator roller is rotated to the closed position, its magnetic poles are oriented so that a centerline between two adjacent poles is pointed downwardly toward the photoreceptor belt. This causes the flux lines of the magnetic field to be substantially parallel to photoreceptor belt and greatly reduces the probability that any carrier particles and toner on the surface of the belt, resulting from a condition of carrier pull from another module, will be lifted onto the surface of the decorator roller, thus contaminating the toner within the module.

Therefore, generally stated, it is the object of the present invention to overcome the drawbacks in prior art color print engines recited above.

More specifically, it is an object of the present invention to provide an improved color print engine which may be produced much less expensively than prior art machines, primarily due to the elimination of critically machine mechanical components which are replaced by non-critical mechanical components that are driven by independent motors, and for which the entire system is synchronized and operated by a precision digital electronic controller.

It is a further object of the present invention to provide a color print engine using flexible belts for carrying a photoreceptor and creating composite images, which belts have a heretofore unacceptable mechanical tolerance of their respective lengths, which is compensated by a precision digital electronic controller.

It is a further object of the present invention to provide a color print engine which uses a dedicated monochrome toner in place of the standard process toners for making monochrome copies.

It is a further object of the present invention to provide an electrophotographic print engine in which the rate of image travel on the photoreceptor belt is independent of and different from the rate of travel of an image receptor through the fuser mechanism to create increased dwell time without sacrificing copy output rate.

It is a further object of the present invention to provide a color electrophotographic print engine of simple architecture which uses a plurality of the laterally spaced-apart downwardly opening, gravity fed toner modules.

It is a further object of the present invention to provide a color electrophotographic print engine using a flexible belt for carrying the photoreceptor and a flexible intermediate transfer belt for developing composite images which uses electrostatic forces between the two belts to assist in maintaining proper registration during the transfer of color component images to the composite image on the intermediate transfer belt.

It is still a further object of the present invention to provide an improved color copier which includes energy management features allowing the copier to be operated from a conventional 120 volt 15 amp branch circuit.

It is still a further object of the present invention to provide a color print engine which is usable with interchangeable image sources including a photocopier image source and a laser raster scan image source.

That the present invention satisfies these objects, and overcomes the drawbacks of the prior art, will be appreciated from the detailed description of the preferred embodiment below.

BRIEF DESCRIPTION OF THE DRAWINGS

FIG. 5 is an elevational diagram of major components of the image development system of a first preferred embodiment.

FIG. 8 is a partially schematic, partially block diagram of the toner deposition sensor of the preferred embodiment.

FIG. 11 is a block diagram of the overall electrical control apparatus for the preferred embodiment.

FIG. 12, consisting of FIGS. 12A and 12B, is a schematic diagram of the digital controller of the preferred embodiment.

FIG. 13 is a block diagram of the digital servo system used to control various motors in the preferred embodiment.

DETAILED DESCRIPTION

Figure 1:
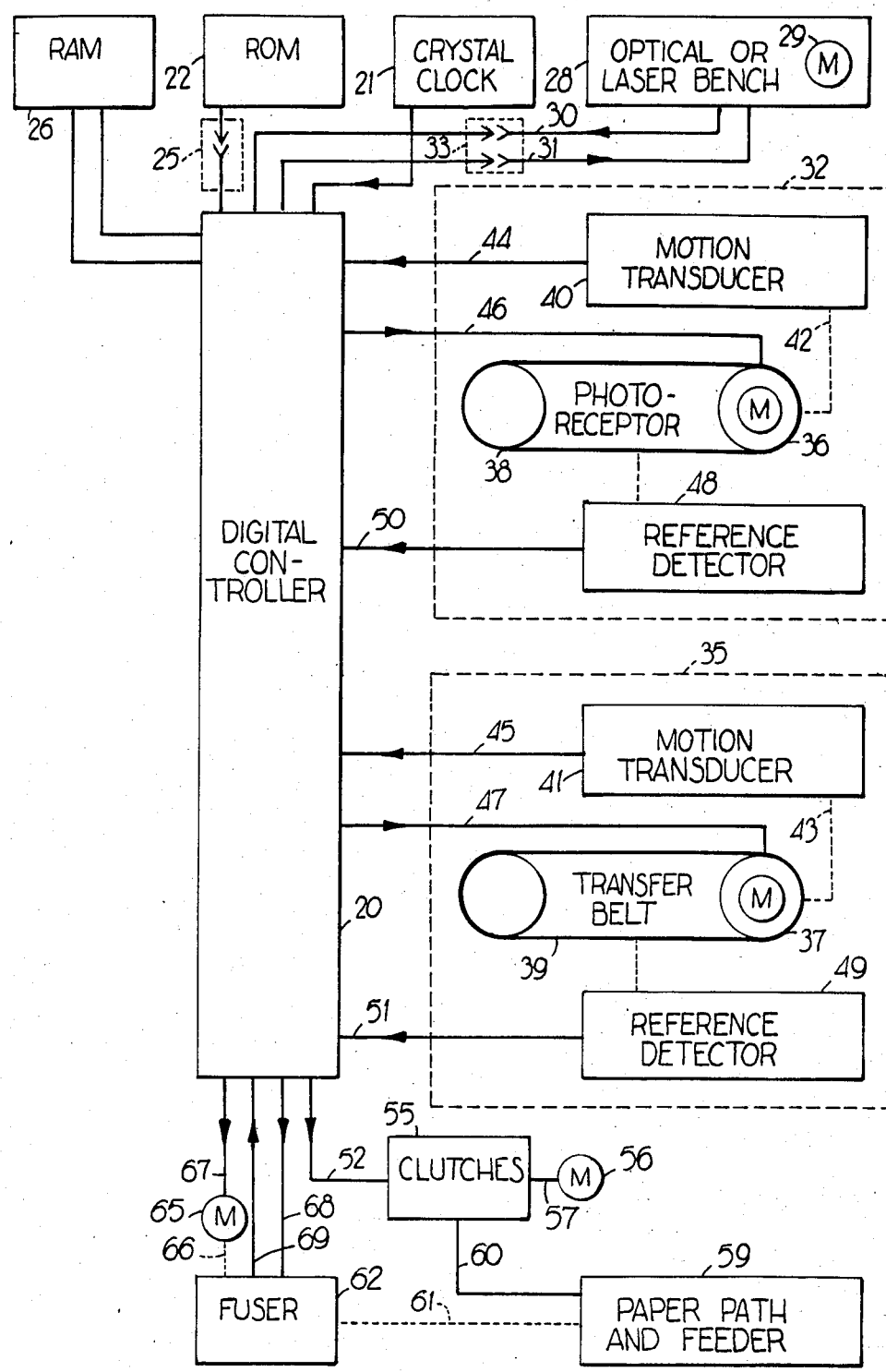
FIG. 1 is a block diagram of the preferred embodiment of the present invention.

Turning now to the various drawing figures, in which like numerals reference like parts, a detailed description of the preferred embodiment will be provided. A block diagram of the basic architecture of the present invention is shown in FIG. 1. The entire machine is operated under the control of a digital controller 20 which will be described in greater detail hereinbelow. Controller 20 includes a master timing source derived from a 12 megahertz crystal clock 21. Controller 20 includes a microprocessor having instructions located in read only memory 22. Read only memory 22 is shown as ROMs embodying ROM 22 can be selectively replaced depending on the particular configuration of an embodiment of the present invention. Also random access memory 26 is connected to controller 20 for storing various values and states, described in greater detail hereinbelow.

The source of images for the present invention is shown by block 28 marked optical or laser bench. This is to indicate that the light signal source for input to the present invention is selectively replaceable and can include an optical bench in the case of the preferred embodiment performing as a copying machine, or a laser bench in the case of embodiments instructed as laser printers. In the preferred copier embodiment, a motor 29 is included to drive an optical scanner. Two-way data communication takes place between controller 20 and bench 28 via lines 30 and 31.

Two main subsystems of the preferred embodiment are the photoreceptor belt subsystem 32 and transfer belt subsystem 35. Each of these subsystems includes conceptually similar components. Each subsystem is driven by a motor, 36 and 37, respectively. Motor 36 drives photoreceptor belt 38 and motor 37 drives transfer belt 39. Motion transducer 40 responds to movement of motor 36 as indicated by dashed line 42. Similarly, motion transducer 41 responds to motor 37 as indicated by dashed line 43.

In the preferred embodiment, these devices include light choppers which will be described in greater detail hereinbelow. Motion transducers 40 and 41 provide output on lines 44 and 45, respectively, to controller 20. Controller 20 provides pulse width modulated input signals to control the speeds of motors 36 and 37 on lines 46 and 47, respectively.

Reference detectors 48 and 49 determine the passage of predetermined reference points past a sensor and are used together with precise timing signals derived from crystal clock 21 to control movement of belts 38 and 39 to achieve proper registration, as discussed above in connection with the summary of the invention. Outputs from reference detectors 48 and 49 are provided to controller 20 on lines 50 and 51, respectively.

The paper drive and paper path in the present invention is also controlled from digital controller 20. Line 52 represents a plurality of control signals to a plurality of clutches 55 which are mechanically linked to a motor 56 as shown by line 57. Clutches 55 activate conventional paper picking and movement functions represented by block 59 and line 60.

As described hereinabove, there is a space represented by dashed line 61, within the paper path between the output of the point at which a complete image is transferred to a sheet of paper, and the input of fuser 62. This spacing is suggested by dashed line 61.

Fuser 62 is driven by a motor 65 as indicated by dashed line 66. Motor 65 is also controlled by digitial controller 20 through signals provided on line 67. Control signals to the fuser are provided from controller 20 on line 68 and information on the status of the fuser, primarily temperature and operating speed, are returned to digital controller 20 on line 69.

As will be apparent to those skilled in the art, FIG. 1 represents the control architecture of the print engine of the present invention. An important aspect of the architecture of the print engine of the present invention may be readily appreciated from viewing FIG. 1. Subsystems 32 and 35 are two substantially identical subsystems for driving the belts used in the present invention to create images. Each subsystem provides precise digital timing signals about the motion of its associated belt to digital controller 20. Also, motors 36 and 37 driving each respective subsystem are driven at speeds controlled by digital controller 20, preferably through the use of pulse width modulated signals. Information about the present position of predetermined points on the belts are provided to controller 20 by reference detectors 48 and 49.

These signals are used, in connection with precise timing signals derived from crystal clock 21, to determine the lengths of belts 38 and 39 as well as their present position at any given point in time. Therefore, as pointed out in the summary of the invention, belts 38 and 39 can be, and in practical embodiments of the present invention are, of a nominal length plus or minus a given intolerance for which digital controller 20 can compensate. An important aspect of this given tolerance is that it is much greater than allowable tolerances in prior art mechanically linked color electrophotographic print engines.

In the preferred embodiment, controller 20 uses the motion of photoreceptor belt 38 as a master reference and adjusts operation of the other subsystems of the preferred embodiment to be properly synchronized with the motion of the photoreceptor belt.

Another aspect of the preferred embodiment represented by FIG. 1 is the fact that the non-critical mechanical motion functions such as picking and feeding of paper are under the control of a common motor 56 and a plurality of clutches 55, all of which are mechanically linked in a manner similar to how such components operate in prior art machines. The significant aspect of this arrangement is that the non-critical mechanical movement elements are operated by a single motor and a plurality of clutches, whereas the critical elements for registration; movement of photoreceptor belt 38 and transfer belt, 39 are made under precise control of digital controller 20.

Furthermore, fuser 62 is driven by an independent motor 65. As noted hereinabove, this allows a sheet of image receptor, preferably paper or plastic transparency material, to be driven through the fuser at a slower rate than images are transferred between belts 38 and 39 during color electrophotography. This is because the fuser must operate on only one composite image, for every three images created on photoreceptor belt and transferred to transfer belt 39. This independent operation allows the dwell time in the fuser to be increased without slowing down the copying rate of the machine or unduly increasing the fuser temperature. This arrangement also allows fuser motor 65 to be driven at substantially the machine speed of belts 38 and 39 when the copier is operating in a monochrome mode.

The replaceability of bench 28 is further suggested by the block representation of plug connector 33. In this connection it should be understood that while the significance of signals on lines 30 and 31 will vary depending on whether a laser or optical bench is mounted over the print engine of the present invention, controller 20 is designed so that an adequate number of digital interface lines are provided to embody lines 30 and 31 so that either type of light source may be used.

Figure 2:
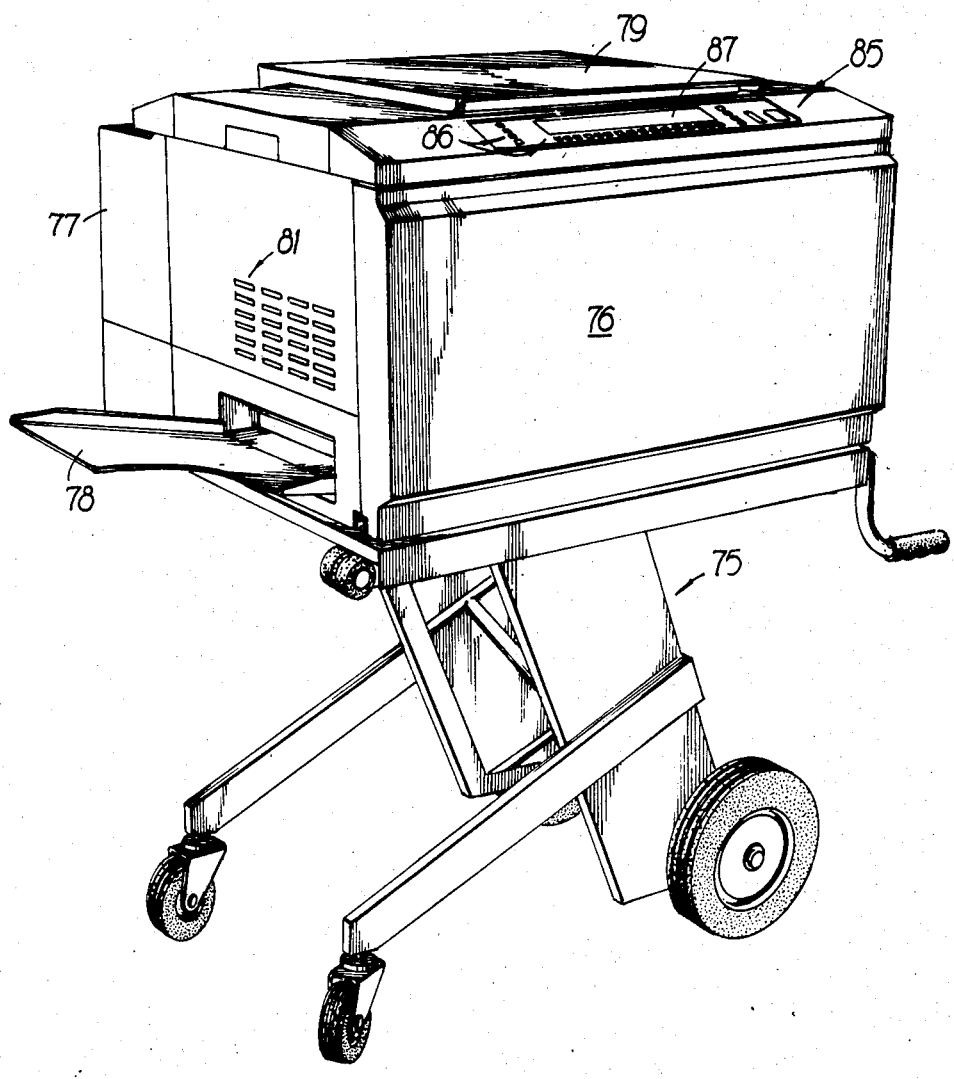
FIG. 2 is a perspective view of the outside of the preferred embodiment of the present invention atop a roller cart.

Turning next to FIG. 2, a perspective view of a copying machine embodying the preferred embodiment of the print engine of the present invention is shown. In FIG. 2, the copying machine embodying the present invention sits atop a conventional rolling chart 75. It should be apparent from FIG. 2, the copying machine of the preferred embodiment is of substantially the same size as a conventional desk top monochrome copier, as was discussed in the background of the invention section.

The outside of the copier includes hinged side panels 76 and 77 and a conventional output tray 78. A cover 79 is hinged at point 80 so that it may be lifted off a platen (not shown) for placement of an original to be copied on top of the machine. A plurality of ventilation slots 81 are also provided in the end of a copier. A keyboard and display area 85 appears on the upper surface of the machine. This area includes a plurality of keys 86 and a display panel 87.

The user controls operation of the machine via inputs entered through switches 86. Display 87 provides the user with conventional information about the mode of operation selected, paper size, number of copies selected, number of copies made, and the like. Among the modes of operation which may be selected via keyboard 85 are whether the machine will operate in a monochrome or full color modes, which are described in greater detail hereinbelow.

Figure 3:
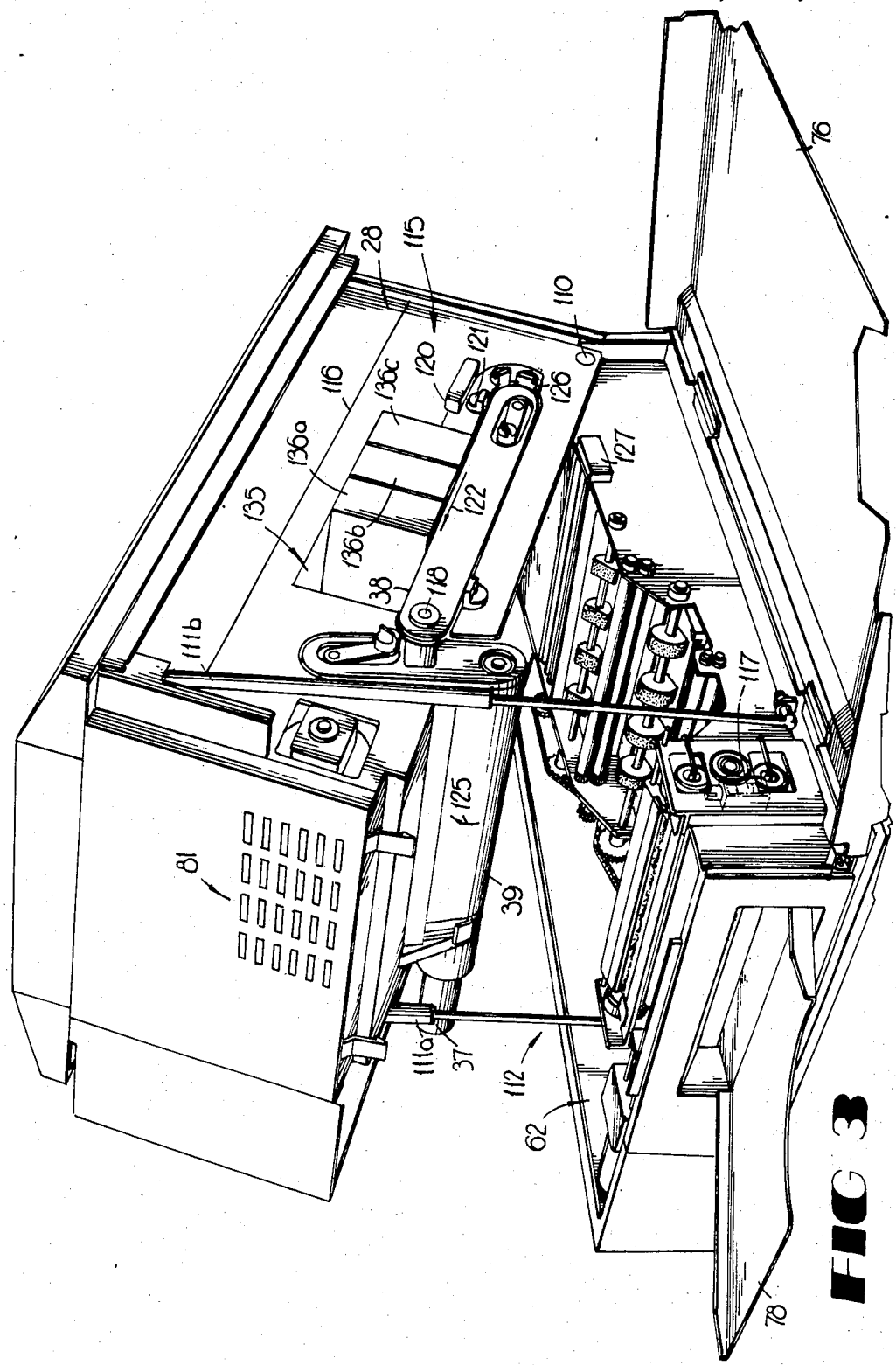
FIG. 3 is a perspective view of the preferred embodiment with side panels down, and the optics bench and image development sections lifted.

FIG. 3 shows a perspective view of the preferred embodiments in an open position. Side panel 76 is lowered, and an upper portion of the machine is raised. The upper portion of the machine is hinged about an axis shown as 110 and is supported by a pair of spring-loaded telescoping rods 111a and 111b. The lower part of the machine is the paper handling assembly, generally indicated at 112. The upper portion of the machine includes an image developing portion 115 and optics bench 28 which is joined to the image developing portion at 116.

As described in connection with FIG. 1, the print engine of the preferred embodiment is specifically designed to be usable with various optical sources such as optical bench 28. It should be noted that optical bench 28 is bolted to image developer section 115 and is interconnected electrically through a plurality of plug connected wires. Therefore, it should be apparent that the preferred embodiment of the present invention has been specifically designed to provide a print engine which is usable with replaceable image sources.

The fuser mechanism 62 is located in front of output tray 78.

A solenoid 117 is used for periodically applying silicone oil to rollers within fuser assembly 62, as described in connection with FIG. 14.

Also visible in FIG. 3 are photoreceptor belt 38 and transfer belt 39. Photoreceptor belt 38 is driven around a roller at 118 by a motor (not shown in FIG. 3). Transfer belt 39 is driven by motor 37. A conventional expose station over photoreceptor belt 38 is shown at 120. This includes an exposure corona 121 of a type well known to those skilled in the art. The corona is used for providing an electrostatic charge to photoreceptor belt 38. It should be understood that in the preferred embodiment, photoreceptor belt 38 rotates in a direction indicated by arrow 122 and thus transfer belt 39 rotates in a direction indicated by arrow 125

A discharge corona 126 is also provided at a cleaning station along photoreceptor belt 38. Any toner which remains on photoreceptor belt 38 after a developed image has been transferred to transfer belt 39 is collected in a receptacle 127 in a conventional manner.

An open space 135 is provided above photoreceptor belt 138 for housing toner modules. In FIG. 3, three toner modules 136a–136c are shown installed within area 135. Area 135 is proportioned to accept up to a total of five toner modules. As noted above in the summary of the invention, it is preferable to have toner modules 136a–136c hold toner materials for the three color process toners and to use a fourth toner module (not shown in FIG. 3) for monochrome copying. The space for the fifth toner module is provided so that custom colors, not reproduceable through the use of available process colors, may be used either in monochrome copying with a copying machine of the type shown on FIG. 3 or to color predetermined portions of an image in a laser printer embodying the print engine of the present invention.

In the preferred embodiment, photoreceptor belt 38 is thirty-eight inches long and transfer belt 39 is nineteen inches long. The importance of this relationship is that the length of transfer belt 39 needs to nominally be an integer submultiple of photoreceptor belt 38. As used in this specification, the concept of an integer submultiple includes a submultiple of one, wherein belts 38 and 39 are of equal length.

It should be noted from inspection of FIG. 3 that it is the use of flexible belts in a full color print engine of the preferred embodiment which is primarily what allows the machine to be constructed so that its size approximates that of a conventional convenience table top copying machine. As noted hereinabove in the background of the invention, construction of a reliable full color copier of this type has been unknown in the prior art.

Figure 4:
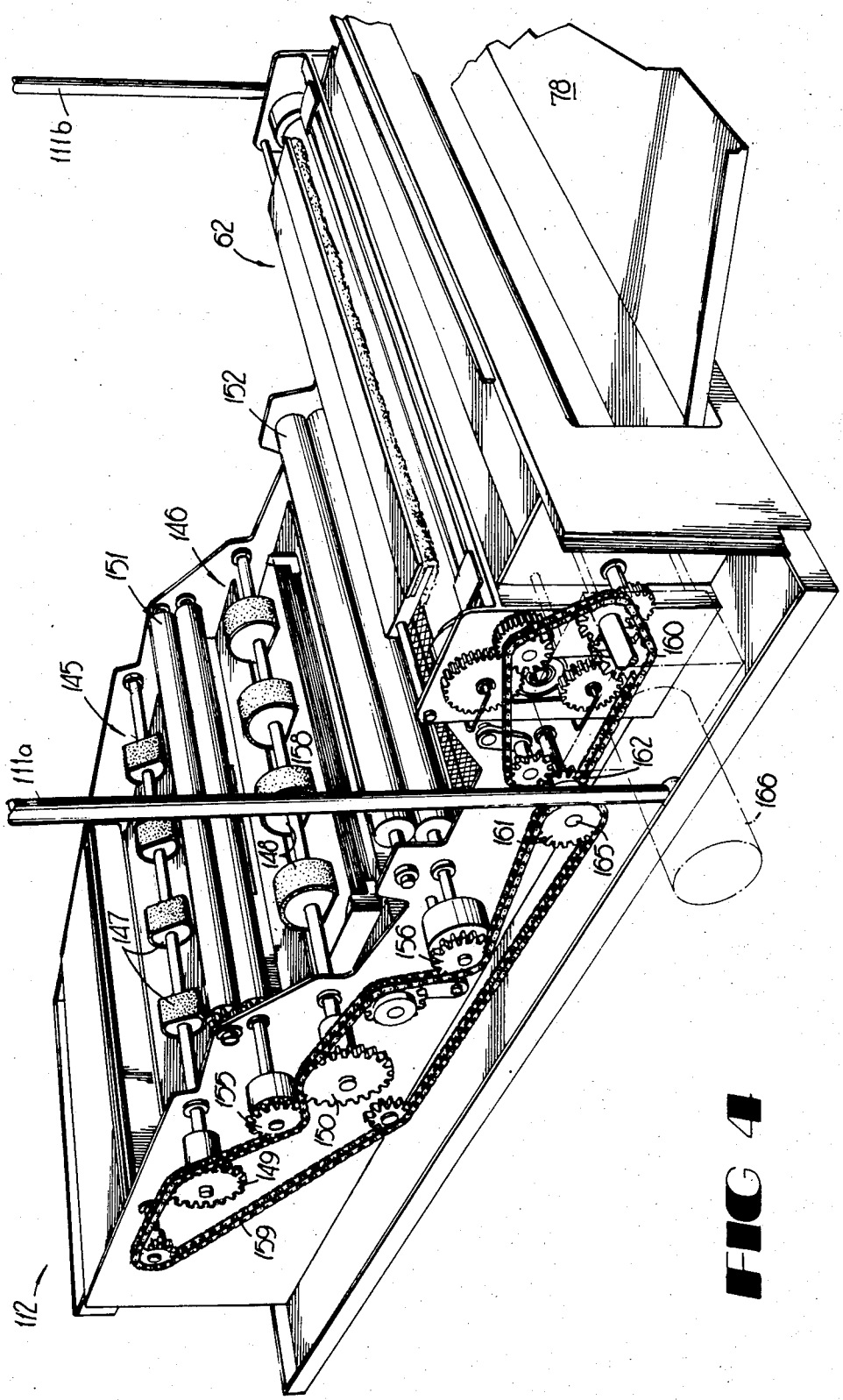
FIG. 4 is a perspective view of the paper handling assembly of a first preferred embodiment of the present invention.

FIG. 4 is a detail drawing showing the paper handling subassembly 112 for the embodiment of FIG. 3. For the most part, this subassembly is conventional. The paper handling subassembly includes two paper trays shown at 145 and 146. Each of the paper trays has associated therewith, a paper picker 147 and 148, respectively. The paper picker assemblies are driven by gears 149 and 150, respectively. Also, a pair of paper gates 151 and 152 are provided for each paper tray and are driven from gears 155 and 156, respectively.

All the above-referenced gears, are driven by a common drive chain 157 and are engaged by operation of electromechanical clutches (not shown) in a conventional fashion. Within paper tray 146, a plurality of sheets of paper 158 are shown.

In the preferred embodiment of the present invention, paper is the most commonly used image receptor for the final image produced by a machine, but other image receptors may be included. In particular, the inventors of the present invention believe that it is important that the print engine of the present ivention be usable with plastic transparency material since color plastic transparencies are particularly useful in connection with overhead projectors for making effective presentations of materials to an audience.

In the embodiment shown in FIG. 4, a fuser assembly 62 is driven by a second chain 160 mechanically linked through gears 161 and 162 on a common shaft 165. All of this is in turn driven by a motor shown in phantom as 166.

Figure 4A:
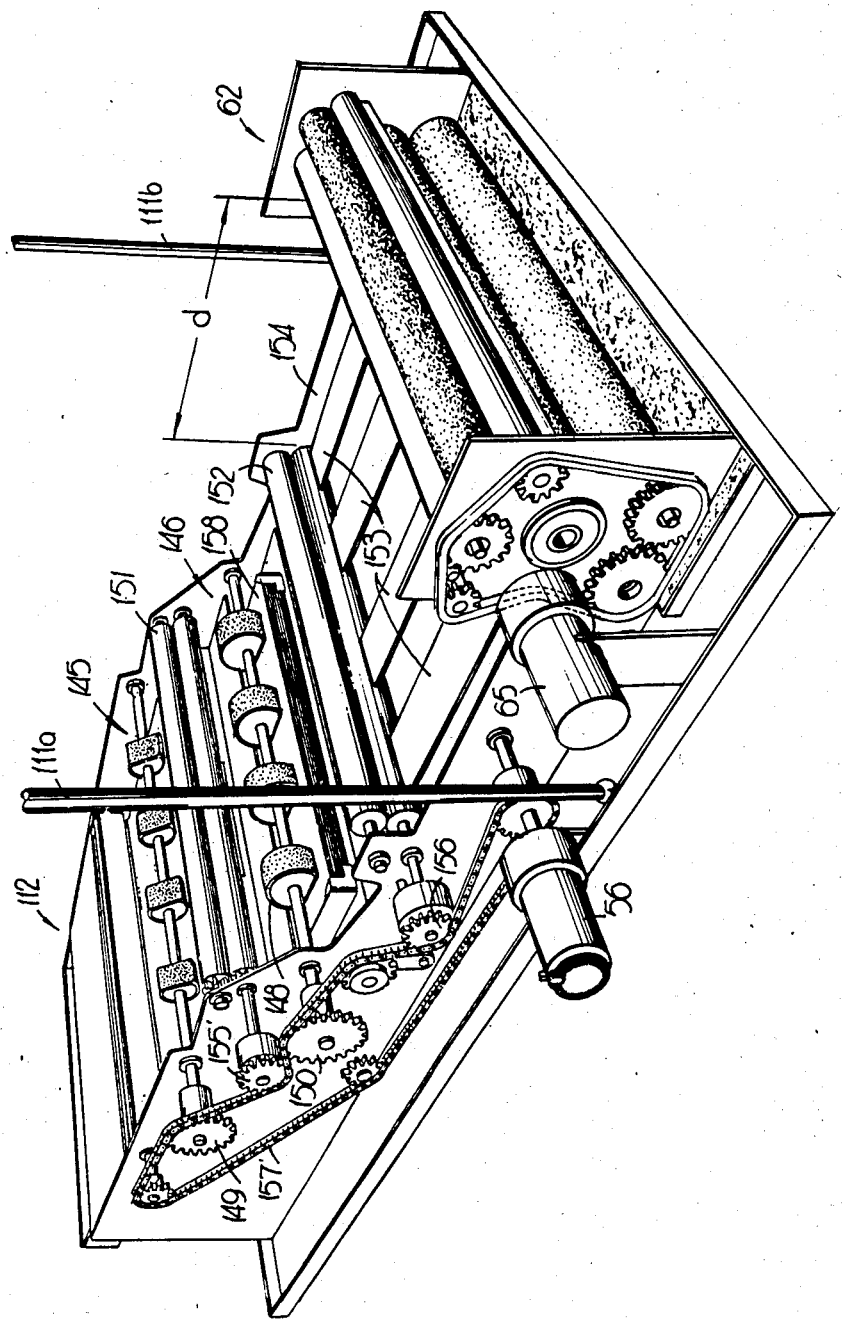
FIG. 4A is a perspective view of the paper handling assembly of a second preferred embodiment of the present invention.

As noted hereinabove, the most preferred form of the present invention is one for which a separate motor is used for driving paper pickers 145 and 146 and paper gate 151 and 152. This embodiment is shown in FIG. 4A. In FIG. 4A, the paper picking and gating assembly is identical to that shown in FIG. 4. All of this is driven by a common drive chain similar to drive chain 157 shown in FIG. 4, which is referenced as 157' in FIG. 4A. In FIG. 4A, the paper picking and gating assembly is driven by a motor 56. An improved fuser assembly 62 as shown in FIG. 4A is laterally spaced apart from paper gate 152. The structure of the improved fuser assembly is described in detail hereinbelow. A plurality of rubber carrying belts 153 carrying a sheet of paper bearing an image transferred from the transfer belt toward fuser mechanism 62. The dimension line d is shown between a point 154 on one of belts 153 and the entrance to fuser mechanism 62. Point 154 represents the point at which a sheet of paper bearing a developed image exits its contact with the transfer belt. Thus, when the trailing edge of a sheet of paper leaves the transfer station, it is laid on belts 153 and is not in contact with either transfer belt 39 or the driving mechanism of fuser 62. Therefore, it is important that distance d be selected so that they hold an entire sheet of paper of at least one commonly used sheet size.

As pointed out above, paper handling assembly 112 is driven by motor 56 and fuser assembly 62 is independently driven by motor 65. In the most preferred form of the present invention, illustrated in FIG. 4A, motor 65 drives fuser mechanism 62 at a rate which produces a slower linear rate of travel of the sheet of paper through the fuser and the linear machine rate at which photoreceptor belt 38 of transfer belt 39 are run. This is possible because the fuser is spaced apart from the output end of the transfer station by at least predetermined distance d.

When the preferred embodiment is in a color copying mode, three separate revolutions of transfer belt 39 are required to create a complete developed composite image. When multiple copies are being made, this means that three additional revolutions of the transfer belt are required to make the next subsequent copy. Therefore, in prior art color copying machines in which the fuser operates at the machine rate, the fuser is idle approximately two-thirds of the time. By adopting the arrangement shown in FIG. 4A, the present invention allows a sheet of image receptor bearing the composite developed image to be driven through the fuser more slowly than the machine rate at which copy creation is taking place and thereby increases the dwell time of the copy in the fuser without slowing down the overall copy output rate. Inventors of the present invention also believe this has an added benefit of providing the user with an illusion that the machine is almost continuously generating copies rather than the normal relatively long period between output of copies experienced in conventional color copying machine.

Before proceeding with a description of the image development subassembly of the present invention, one important aspect of the present invention is emphasized by viewing FIGS. 3 and 4A in conjunction with each other. As may be seen from inspection of three figures, belts 38 and 39 in the image development subassembly are driven independently of the drive mechanism within paper handling assembly 112. In the preferred embodiment, a precision digital controller, described in greater detail hereinbelow, is used to appropriately synchronize, and in some cases intentionally unsynchronize, operation of components of these two subassemblies in order to achieve optimum results from the print engine.

Turning next to FIG. 5, a detail drawing of a first preferred embodiment of a portion of the image development subassembly is shown. FIG. 5 shows a detailed drawing of the embodiment of FIG. 3. Each of belts 38 and 39 are mounted about a pair of rollers on pivot points 118 and 168 for belt 38 and 170 and 171 for belt 39. Associated with the mechanical elements carrying these belts are tension adjusting cams 175 and 176. These cams are loosened when belts 38 and 39 are to be removed, and are used to properly tension the belts after installation.

A plurality of coronas 121, 126 and 128 are located at expose station 120. Coronas 126 and 128 are sensitizing coronas used to charge belt 38 prior to creation of an electrostatic image. Corona 121 is a discharging scoratron. On the lower side of photoreceptor belt 38, an AC corona 129 is located. This corona is excited with an alternating current voltage which tends to disperse charge remaining on the belt and thus loosen any residual toner particles which may be left on the belt after transfer of the developed image to transfer belt 39. The particles can therefore be cleaned by a scraper blade (not shown) over cleaning station 127 (FIG. 3).

Also shown in phantom at expose station 120 is an electrostatic voltmeter 123 used in the copy quality monitor of the preferred embodiment.

As photoreceptor belt 38 moves past expose station 120, light from optics bench 28 (FIG. 3) is focused onto the belt in synchronism with its movement to provide an electrostatic image on the photoreceptor belt. Assume for the moment that color copying is taking place. Toner modules 136a–136c contain the three color process toners. When the first image is developed, an appropriate separation filter (not shown) is interposed between a light source and the optics bench and expose station 120 in a known manner. As belt 38 moves past expose station 120 in the direction shown by arrow 122, an electrostatic image of this particular color component is created on belt 38 in a manner which will be familiar to those skilled in the art, and which was described in the background of the invention.

Assume that the first color developed corresponds to the color contained in toner modules 136a. As a developed image moves past toner module 136a, the module is activated to deposit toner materials on the charged portions of the surface of belt 38 to provide a developed image of this color component of the original. As belt 38 continues to rotate, the leading edge of the developed image eventually reaches point 178 at which belt 38 first makes contact with belt 39. The developed image is transferred from belt 38 to belt 39 as the belts continue to rotate and the image passes from point 178 to point 179.

It should be noted in FIG. 5, belt 38 is urged firmly against belt 39 and an open space 180 is provided behind portion of belt 39 which contacts belt 38. This provides a contact area between points 178 and 179 which is referred to herein as the wrap of the belts. In the preferred embodiment, the length, along the direction of travel of belt 38, of the wrap area between points 178 and 179 is approximately 0.6 inch. It is believed preferable to have this area be at least ½ inch in length.

Two mechanisms resulting from the wrap area of the belts aid in transfer of the image and maintenance of proper registration. First, a considerable mechanical force is provided in the wrap area simply from the force of having belt 38 urged strongly into belt 39, as shown. Secondly, belt 39 is charged to a high positive potential by corona (not shown) so that it has approximately one kilovolt of electrostatic potential as a result of positive surface charge. This surface charge causes the toner material on belt 38 to be transferred to the belt, thus transferring the developed image, and furthermore creates extremely strong electrostatic forces between belts 38 and 39.

Considering a one kilovolt surface charge potential on belt 39, and the intimate contact between the belt in the wrap area between points 178 and 179, it will be quickly appreciated that a very intense electric field strength exists in the wrap area. This helps hold the belts tightly together and prevents any slip from occurring as composite images are laid one over the other. Indeed, a prototype of the present invention has been operated with the above-recited charge conditions on the belts with the motor driving transfer belt 39 turned off, and the electrostatic forces between the two belts were sufficient to cause contained rotation of belt 39 and to overcome the mechanical friction and inertia of the components attached thereto.

Once approximately half of belt 38 has passed expose station 120 after development of a first composite image, the second separation filter is inserted in the optical path in optics bench 28, and an electrostatic image of a second color component of the original is exposed on photoreceptor belt 38. Toner module 136b is activated as this electrostatic image passes under it in order to provide a second color component developed image. This image is likewise transferred to belt 39 as a third color component image is being developed.

It should be noted that belt 38 is of sufficient length so that, for conventional 8½×11 copies, the second electrostatic image is being developed on one portion of the belt as the first developed image is being transferred to belt 39. Therefore, one and one-half revolutions of belt 38 are required to create, develop and transfer a three-color composite developed image during three rotations of transfer belt 39.

It should be noted in connection with FIG. 5, that one unique aspect of the architecture of the preferred embodiment is that all of toner modules 136 are downward facing and gravity fed. The conventional wisdom of those skilled in the art of color copying indicated that downward feeding gravity driven toner modules would not be usable in a color copying machine because of the fear that excess toner would fall out onto the belt and contaminate the images. The improved toner modules which allow for this architecture are described in greater detail hereinbelow in connection with FIGS. 15-18.

Once a complete composite image has been transferred to photoreceptor belt 39, an image receptor, normally a piece of paper, is provided by paper handling subassembly 112 (FIG. 4) to a transfer station at 185. In the first preferred embodiment, a flexible web shown as 186 is provided under the roller rotating about pivot point 171 so that the paper is urged against transfer belt 39. Once transfer is complete, the paper then moves through a lateral open space shown by dimension line d in FIG. 5.

Dimension d corresponds to the same dimension shown in FIG. 4A, and is chosen such that at least one standard size sheet of paper (8½×11 in the preferred embodiment) can occupy space d between the point at which the trailing edge of the sheet of paper last contacts belt 39, and the point at which the paper enters fuser mechanism 62. Therefore, once a composite image has been transferred from transfer belt 39 to the sheet of paper, it is free from any need to have its movements synchronized with transfer belt 39 and can enter the fuser which, in the most preferred embodiment of the present invention, can be operated at a slower speed than the machine speed at which belts 38 and 39 are operating. It should be understood that the concept of machine speed is linear rate of travel of the image carrying and developing elements. Therefore, by spacing the exit from the transfer station at 185 by at least a predetermined distance d from the entrance to fuser 62 shown at 187, the fuser may be, and is, operated at a speed independent of the speed at which transfer belt 39 is moving.

Next, operation of the image developer when the preferred embodiment is in a monochrome mode of operation is discussed. Toner module 136d carries a conventional black monochrome toner material. Naturally, when the copier of the preferred embodiment is in a monochrome mode of operation, no color separation filters are inserted in the optical path.

As an electrostatic monochrome image was created on belt 38, the image moves under toner module 136d which applies monochrome toner to electrostatic image to provide a developed monochrome image. When the developed image reaches the wrap section between the belts at point 178, it is transferred to the transfer belt 39 in the manner described hereinabove.

As the leading edge of the transferred developed image reaches paper entrance station 185, a piece of paper is provided by the paper handling mechanism and thus the developed monochrome image is transferred immediately to the paper. When a position on photoreceptor belt which is approximately half way from the point at which the first monochrome image was created reaches the expose station, a second image of the original (assuming the user has selected multiple copies) is exposed on the photoreceptor belt. This image also passes under toner module 136d where it is developed.

Considering the nominal two to one ratio between the lengths of belts 38 and 39, it will become apparent that transfer belt 39 will have made approximately one complete revolution at the time the leading edge of the second developed image arrives at point 178. The above described process repeats itself and a sheet of paper is provided to transfer station 185 when the leading edge of the transfer developed image on belt 39 arrives there.

What should be apparent from the foregoing discussion is the fact that when the preferred embodiment is in a monochrome mode of operation, developed images from belt 38 are transferred to belt 39 and then immediately to an image receptor, normally in the form of a sheet of paper or a plastic transparency. The timing of exposure and development of monochrome images on belt 38 is such that it substantially duplicates the timing for exposure of color component images when the machine is in a color mode of operation. Therefore, timing of the transfer of the monochrome images to belt 39 also duplicates that of the color process. The main difference, insofar as operation of belts 38 and 39 is concerned, is that each developed image is transferred immediately from belt 39 to a sheet of paper as belt 39 makes one complete revolution. Therefore, it will be apparent that the copy output rate of the preferred embodiment in the monochrome mode of operation is approximately three times the copy output rate of the machine in the color mode.

In the preferred embodiment, the nominal machine speed of belts 38 and 39 is ten inches per second. Therefore, the preferred embodiment will produce slightly more than six full color copies per minute in the color mode. In the monochrome mode, the preferred embodiment can produce over eighteen copies per minute of 8½×11 originals, and thus it produces one copy in slightly less than four seconds. From this, it can be appreciated that the preferred embodiment indeed achieves the object of the invention recited above of providing a full color copier which also has a monochrome mode of operation with a copy output rate that is acceptable to make it the standard office copying machine for many small and medium size office environments.

The use of a separate toner module 136d for a dedicated monochrome toner is used to overcome two drawbacks of prior art copiers cited hereinabove. The first drawback was that in copying a monochrome original, prior art machines went through the unnecessary steps of shooting three substantially identical composite images of the monochrome original through the separation filters. This arrangement, of necessity, causes the prior art color copiers to produce monochrome copies at the same rate as they produce color copies.

Secondly, the use of process colors for producing black monochrome copies has long been recognized as providing copies of inferior quality insofar as the black color content is concerned. Additionally, even slight problems in registration using process black cause a decrease in sharpness of the image since it is smeared due to slight offset of the composite images and furthermore, the outline fringes of such composite images will show traces of one of the process colors.

Naturally, when the preferred embodiment is in its monochrome mode of operation, the extra time available for increasing dwell time in the fuser, described hereinabove, is lost. Therefore, the fuser mechanism 62 must operate at a linear rate of approximately ten inches per second which is the machine rate at which belts 38 and 39 are driven. However, two factors offset this effect. First, since a dedicated monochrome toner is used, it is possible to select monochrome toner materials requiring less dwell time in a fuser of a given temperature in order to properly fix the toner materials. Additionally, since the monochrome images are exposed without the separation filters in the optical path, the light source used in exposing monochrome copies is selected to be of one-half the intensity of the light source used when exposing color component images. Therefore, when in a monochrome mode of operation, the optics bench draws much less power than it does when the machine is in a color mode of operation and more power can be dedicated to increasing the fuser temperature as the dwell time decreases.

In the preferred embodiment, two 400 watt lamps are used in the optics bench and only one of these is turned on when the machine is in a monochrome mode of operation.

As noted above, a fifth toner modular 136e is provided for creating copies with custom colors. As used in this specification, custom colors include colors which may not be accurately reproduced within the limitations of the three color process colors contained in toner modules 136a–136c. Many companies and organizations have adopted specific colors used in connection with logos, trademarks and the like, and prefer for such colors to be displayed on material they distribute. Methods for creating custom monochrome toners for reproducing a specific custom color are well known to those skilled in the art.

In the preferred copier embodiment of the present machine, a custom color toner in toner module 136e may be used to print either an entire document when a machine is in a monochrome mode of operation or may be used to customize stationery or the like which may then be reinserted into the paper trays of the machine to have other material reproduced thereon by the processes described above.

For example, if a user desires to include a logo with a custom color on a plurality of sheets of paper upon which copies are to be made, a monochrome image of the logo may be placed on the optics bench. The machine is placed in a monochrome mode of operation with the custom color selected. Multiple copies may then be made which will provide the logo bearing the custom color in the position dictated by the monochrome image on the original. Once this is accomplished, the resultant sheets of paper bearing the custom colored logo may then be reinserted into the paper tray and either monochrome or full color material may be copied onto these sheets.

In laser printer embodiments of the present invention, a four color operation is used to provide custom coloring in particular areas of a printed image. In the case of the laser printer, it is up to the creator of the software driving the laser printer to define which areas of the printed page will bear particular colors. The software need only to be able to specify a printed image area to be used which will bear the custom color and provide appropriate control signals to the embodiment of the present invention.

When this process is run, a four color copying process takes place in which three process color composite images are used in their normal fashion to create full color material on the printed page. Subsequently, a single monochrome composite image is exposed by the laser beam on appropriate areas of photoreceptor belt 38, and this fourth composite image is developed under toner module 136e and transferred as part of an overall four layer composite image to transfer belt 39. Once the four separate images have been transferred to belt 39, the overall composite image is transferred to a sheet of paper which is provided to the fuser.

Additionally, an extremely useful mode of operation is one in which the custom color is used to color a particular area of the printed page (for example a company logo) and black monochrome toner is used to print the balance of information on the page. In this mode of operation, two separate composite images are created in response to signals from the software providing input to the laser printer. One composite image defines the area to be colored by the custom color which is developed by the toner in module 136e and transferred to belt 39. Subsequently, the laser bench develops an electrostatic image corresponding to the black monochrome information to be included on the printed page. This is developed under toner module 136d and transferred as a second composite image onto transfer belt 39. When this transfer has been completed, the next time leading edge of the two component composite image on belt 39 arrives at transfer station 185, a sheet of paper is provided at this location and the two color composite image is transferred.

It will be readily appreciated that in this mode of operation, two separate monochrome images are developed which are overlaid onto belt 39 as a composite image. Naturally, it is assumed that the user will take care to make sure that the black monochrome images and the custom color monochrome images are spatially separated. Since two images must be created for each copy when in this mode of operation, the preferred embodiment can produce slightly more than nine output copies per minute.

Figure 6:
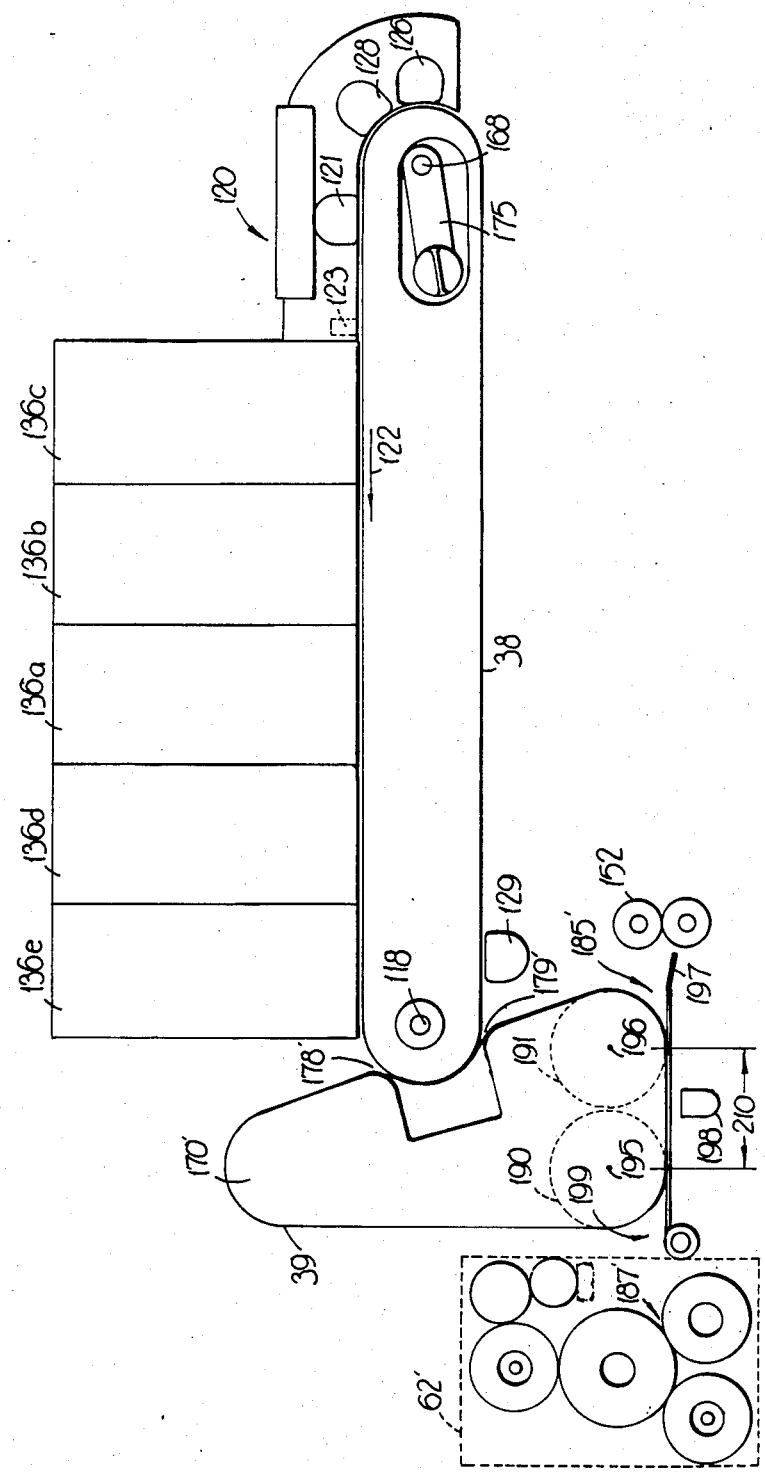
FIG. 6 is an elevational diagram of the major components of the image development system of an alternate preferred embodiment.

Turning next to FIG. 6, an alternate preferred embodiment of the structure driving transfer belt 39 is shown. The belt is driven around a roller of circular cross section rotating about an axis shown as 170' to indicate its correspondence to axis 170 in FIG. 5. However, at the lower portion of the assembly, two additional rollers 190 and 191 rotate about axes 195 and 196. In this embodiment, paper introduced to a transfer station, indicated as 185', strikes a deflector plate 197 and is brought into contact with transfer belt 39 under roller 191. A corona 198 charges the paper to transfer the toner particles constituting the developed image on belt 39 to the paper. The paper then exits the transfer station at 199.

In the embodiment of FIG. 6, the space between entrance point 185' and exit point 195 of the transfer station has a length by dimension line 210. In the preferred embodiment shown in FIG. 6, length 210 is approximately 2½ inches. The relatively large area of contact between transfer belt 39 and the paper provided by the three roller embodiment of the transfer station shown in FIG. 6, takes advantage of the electrostatic forces between belt 39 and the paper to keep the paper from slipping, and thus smearing an image, and to assure a high percentage of transfer of the toner to the resultant copy.

Figure 7:
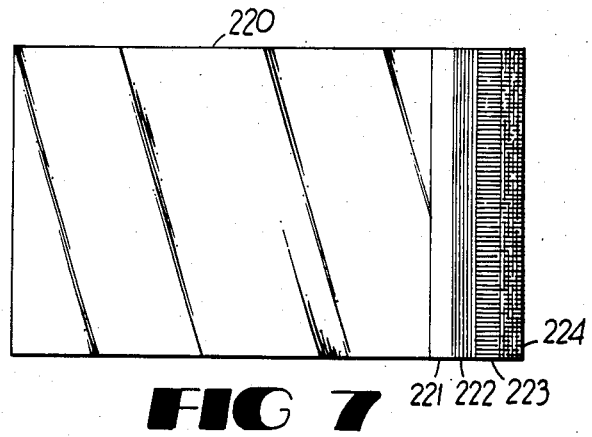
FIG. 7 is a plan view of the lower side of the platen of the preferred embodiment showing color reference bars.

Certain aspects of the novel copy quality monitoring system of the present invention will now be described in connection with FIGS. 7 and 8. FIG. 7 shows the glass platen 220 for accepting originals in copy machines embodiments of the present invention. The view of FIG. 7 shows platen 220 as viewed from the interior of the machine. As will be apparent to those familiar with copying machines, platen 220 lies under cover 79 (FIG. 2).

On the right-hand end of platen 220 are four reference color bars 221-224. These bars are, respectively, white, magenta, cyan, and yellow. In FIG. 7, bar 222 has been lined for red and bar 223 has been lined for blue to indicate magenta and cyan, and bar 224 is lined for yellow. These four color bars constitute a reference means for providing a plurality of electrostatic test images on the photoreceptor belt 39. When the copying machine is to be calibrated to test for copy quality, the optical system of optics bench 28 is configured to focus images of reference bars 221-224 onto the photoreceptor belt as an image is shot through each of the successive separation filters in the optical system. The digital controller of the preferred embodiment, described in greater detail hereinbelow, keeps track of where each of the images of reference bars 221-224 is located as each image is shot.

First, a non-contact electrostatic volt meter is positioned over photoreceptor belt 38 at 123 (FIGS. 5, 6). When digital controller 20 (FIG. 1) detects that the position on photoreceptor belt 38 bearing the image of one of the color bars is passing under the electrostatic volt meter, a reading of the voltage is made. Note that, for each successive filter used to create such an image, a reference bar on an electrostatic image should exist from the contribution of white bar 221 as well as the particular one of reference bars 222 through 224 which corresponds to the filter through which the image is shot.

It is believed by the inventors of the present invention that it is known in the art to test the electrostatic voltage on a photoreceptor belt in a copying machine under conditions of no light and intense exposure to white light. However, it is believed that the testing of electrostatic voltages present on electrostatic images created by shooting a reference color standard through the separation filters in a color copying machine is new in the art.

If the measured electrostatic voltage is not within an acceptable range, digital controller 20 goes to a look-up table contained in memory and makes an appropriate adjustment to the input voltages charging the photoreceptor belt coronas (FIGS. 5, 6). The images are then reshot until digital controller 20 detects an acceptable output voltage level from the electrostatic volt meter.

In addition to electrostatic measurement of electrostatic images created in response to reference color bars 221-224, the preferred embodiment additionally develops these images, and tests for adequate toner deposition for each component color. First, it should be noted that this arrangement allows digital controller 20 to detect defects in operation of toner modules 136 even when the corona voltages used on the belts are appropriate for the current ambient conditions of humidity.

When executing this test, each electrostatic image of a reference color bar passes under the appropriate one of toner modules 136 (FIG. 5, FIG. 6) and is developed in the normal fashion. As each reference image is developed, it passes under an optodetector station illustrated in FIG. 8. FIG. 8 is a partially block and partially schematic diagram of the optical detector used in sensing toner deposition in the preferred embodiment. An LED 226 is driven by a 15 kilohertz signal on line 227 which is provided from digital controller 20. LED 226 is placed over photoreceptor belt 38 and is excited by the signal on line 227 when the developed reference image including toner shown as 228, passes under the LED. Light from LED 226 is indicated by dashed line 229 as striking toner 228, and some of this light is reflected, as indicated by dashed line 230. However, because of the particulate nature of toner 228, significant amounts of the light 229 illuminating toner 228 are scattered as indicated by arrows 231 in FIG. 8. The unscattered light represented by line 230 illuminates the base of a phototransistor 232.

As will be apparent to those skilled in the art, modular circuits including photodiode 226 and phototransistor 232, together with appropriate focusing optics, are commonly available and are what are used in the preferred embodiment to embody the corresponding elements shown in FIG. 8. Thus, it will be appreciated that these devices are arranged to physically be directly over photoreceptor belt 38 to both illuminate the belt and to detect reflected light therefrom.

Phototransistor 232 is arranged in a simple common emitter configuration taking output at its collector, which is coupled through a capacitor 235 to a high pass filter 236. Capacitor 235 prevents any DC component from the collector current of transistor 232 from reaching the input of high pass filter 236. Filter 236 removes any 60 and 120 cycle noise from the signal which appears at its output on line 237. From line 237, the signal is rectified by full-wave rectifier shown as 238. A pulsed unipolar output signal is provided on line 239 which is passed to the input of a low pass filter 240.

By proper selection of the filter order and cut-off frequencies for filters 236 and 240, which is well within the ordinary level of skill in the art, a DC signal is provided on line 241 which has a magnitude that is proportional only to the 15 kilohertz component of the input signal to the base of transistor 232. The DC voltage level on line 241 is provided to an analog multiplexer 374 (FIG. 12) which forms a part of digital controller 20.

In the preferred embodiment of the optical detector of the present invention, LED 26 produces, and transistor 232 responds to, infrared light. The thickness of the deposited toner 228 on belt 38 is detected primarily by measuring the scattering phenomena represented by lines 231. Up to a certain minimum acceptable toner thickness, the more toner present under LED 226, the more the infrared radiation will be scattered. Therefore, the lower the level of infrared radiation illuminating the base of transistor 232, the greater the amount of toner deposited. This is because photoreceptor belt 38 is a very smooth surface of relatively high reflectivity. Thus, if the toner is too thinly deposited, or absent altogether at certain locations under LED 226, a very large percentage of the emitted infrared radiation from the diode will strike the base of the transistor.

There are two significant advantages to the arrangement of FIG. 8 described hereinabove. The selection of infrared wavelengths for the radiation used to detect toner deposition provides a condition in which the reflected radiation is substantially insensitive to the color of toner materials 228. Thus, there is a direct correlation between the 15 kilohertz component of the input signal to the base of transistor 232 and the thickness of toner 228, substantially independent of the toner's color.

However, the use of an infrared photodetector 232 has a potential of rendering the optical detector sensitive to variations in ambient temperature within the machine. Therefore, the use of the 15 kilohertz signal to excite LED 226, and the 15 kilohertz detector circuitry shown on the right-hand side of FIG. 8, removes any effects of ambient temperature from the infrared measurement. It should be understood that while use of infrared radiation is preferred, it is also possible to construct embodiments of the toner deposition detector of FIG. 8 using radiation having frequencies of visible light. Thus, as used in this specification and the appended claims, reference to a light source embodied by LED 226 will be understood to include radiation within the visible light spectrum as well as radiation in adjacent spectra, including the infrared.

In addition to use of the optodetector of FIG. 8 over belt 38, an identical detector is also provided over belt 39. This detector is used to test the quantity of toner transferred from belt 38 to belt 39 when conducting print quality tests using developed images of reference bars 221-224 (FIG. 7). Appropriate adjustments to the charged state of belt 39 are made by the digital controller in response to the measured amounts of toner on the developed reference images which are transferred to belt 39.

Before describing the digital controller of the preferred embodiment in detail, it is appropriate to discuss two important mechanical components which interact with the digital controller.

Figure 9:
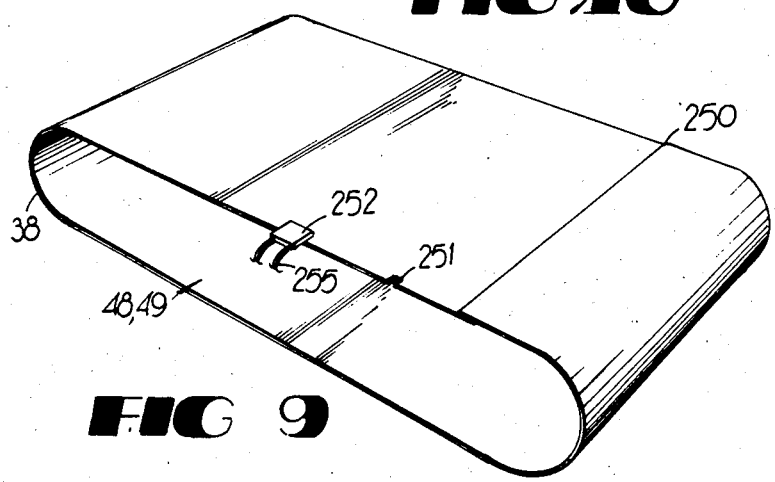
FIG. 9 is a perspective view of a typical photoreceptor belt used in the preferred embodiment.

Turning first to FIG. 9, an illustration of belt 38 is shown. Belt 38 has a seam 250 in it created during original fabrication. It should be understood that some belts available to embody photoreceptor belt 38 have no physical seam, since they are originally fabricated as endless belts. However, references to a seam area on belts, as that term is used in this specification, references a predetermined area on the belt which is treated as having a seam by the digital controller, even if no physical seam is present. An index notch 251 is shown on one side of belt 38. Extending over this same edge of belt 38 is an optodetector pair 252. Optodetector 252 is a conventional device which includes a light-emitting diode illuminating the surface of belt 38 and a phototransistor positioned under the belt. Each time index notch 251 passes under the LED of optodetector 252, an output signal from the detector's phototransistor is provided on wires 255.

It should be understood that, while not separately shown, a similar index notch and optodetector are used in connection with belt 39. Additionally, belt 39 also has a seam area as defined hereinabove.

As will become apparent from the description of the digital controller, index notches 251 on belts 38 and 39 are used to detect each respective belt reaching a predefined home position.

Figure 10:
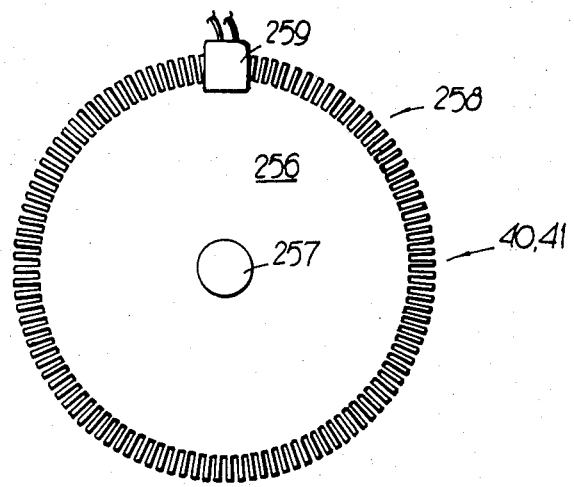
FIG. 10 is an elevational view of a representative light chopper used in the servo system of the preferred embodiment.

FIG. 10 is a representation of the light chopper wheel used on each of drive motors 36, 37, and 65. Each of these light choppers consists of a wheel structure 256 which is mounted on motor shaft 257 of the respective motor with which the wheel is associated. Each wheel has a plurality of teeth, indicated generally at 258. An optodetector 259 is positioned over the edge of wheel 256 so that teeth 258 sequentially make and break the optical path between the light source and the photodetector within optodetector 259. Such an arrangement is commonly used in other electromechanical devices as a speed transducer, and it is used as such in the present invention. The output from optodetector 259 is an alternating electric voltage having a frequency which is proportional to the rotational speed of wheel 256.

It should be understood that motors 36, 37 and 65 in the preferred embodiment are DC motors which have reduction gears provided between the motor's output shaft and the shafts upon which the rollers described herein carrying belts 38 and 39, and the shaft of the main fuser drive, are mounted. The gear ratios are selected so that in response to an appropriate DC voltage input signal, the motors will drive the components of the preferred embodiment at a preselected speed. Furthermore, the approximate value of the frequency of the output signal from optodetector 259 and the speed of the driven element, for example, photoreceptor belt 38, is known.

With this background, the digital electronic controller of the preferred embodiment will now be described in connection with FIGS. 11 and 12. Turning first to FIG. 11, a block diagram of the overall electronic controller of the preferred embodiment is shown. The entire operation of the copying machine of the disclosed embodiments is controlled by a digital controller board 20 shown in the middle of FIG. 11. Digital controller 20 is in two-way communication with each of the other control boards, upper driver board 275 and lower driver board 276. Upper driver board 275 provides drive to the solenoids in toner modules 136, which will be described in greater detail hereinbelow. A plurality of conventional paper path and paper tray quantity sensors are shown as 277 and 278, respectively. Additionally, a transfer belt cleaning solenoid is shown at 279 which selectively moves a blade into and out of contact with transfer belt 39 after a composite image has been transferred to an image receptor.

Lower driver board 276 controls paper path clutches 55. Additionally, this board drives paper drive motor 56 and fuser drive motor 65. A plurality of conventional paper tray identity sensors 280 also communicate with controller 20 through lower driver board 276. Additionally, machine interlocks 281, which detect whether all panel openings and the like are properly closed, communicate through lower driver board 276. Also, a fuser temperature sensor 282 connects through lower driver board 276.

As described in greater detail in connection with FIG. 12, the processor operating digital controller 20 includes a plurality of analog input lines and on-board analog to digital converters. The various analog voltages sensed throughout the electrical system of the preferred embodiment are connected directly (through plug connectors to the various driver boards) to these analog inputs so that the digital controller can respond to these signals.

A substantially conventional main power supply is shown at 285. However, controller board 20 communicates certain signals to main power supply 285 to implement the novel energy management features for the copier of the preferred embodiment. Power supply 285 provides power to fuser heater 286, expose lamps 287, and an AC cooling fan 288, all of which are controlled by triacs.

Controller board 20 also communicates with switches in display on front panel 85 and the high voltage supplies 289 for controlling the input voltages to the various coronas within the copier. Controller 20 also communicates with electromechanical control devices in optics bench 290 to synchronize the optical scan of an original to the movement of photoreceptor belt 38. Lastly, digital controller 20 also controls sensitizing coronas and interdocument control lamps at expose station 291 and receives the output from electrostatic voltmeter 123 (FIGS. 5, 6).

The architecture of the overall electronic control of the present invention is designed to distribute the work to be done by various electrical components in a manner which allows all of the necessary work done by high-speed digital controller 20 to be accomplished in real time, and to distribute other tasks which are less time critical to boards 275 and 276. Once the basic structure of digital controller 20 is described, implementation of the other control functions present on boards 275 and 276 will be apparent to those skilled in the art in light of the explanations contained in the specification of how these functions interact with the controller. Additionally, a significant number of the control functions shown on FIG. 11 are conventional in the art of electrophotographic copiers and laser printers.

A partially block and partially schematic diagram of the digital controller 20 of the preferred embodiment is shown in FIG. 12, which consists of FIGS. 12A and 12B. The digital controller 20 is constructed around a high-speed microprocessor 310. In the preferred embodiment, processor 310 is implemented by a type 8095 high-speed microcomputer currently manufactured by Intel Corporation of Santa Clara, Calif. A master source of clock and timing signals is provided by a 12 megahertz crystal clock 21 which connects to an appropriate input pin of processor 310 via line 313.

The 8095 is a high-speed 16-bit processor which includes a multiplexed address and data bus. The lower order 8-bits of this bus are shown at 311 with the higher order 8-bits being sub-bus 312. Extensions of these sub-buses are provided to a conventional 16-bit address latch 315 which holds an address on its 16-bit output bus 316 in response to an address latch enable signal appearing at output 317 of the processor. Also, a pair of conventional 8-bit bi-directional bus transceivers 318a and 318b control data flow on the bus on its extensions appearing at 319 and 320.

The use of address latches such as latch 315 in response to address latch enable signals in a processor having a single bus which multiplexes address and data signals will be well known to those skilled in the art, and need not be described in detail. Extensions 319 and 320 of the 16-bit bus are provided to a memory block which bears reference numerals 22 and 26 to indicate that it contains both read only memory 22 and random access memory 26 shown in FIG. 1. Naturally, the read only memory contains look-up tables and some of the instruction signals for controlling processor 310.

A plurality of conventional decoders and gates are all represented by address decoders and control block 321. Implementation of such devices is well known to those skilled in the art. In particular, the I/O for controller 20 is memory mapped. Implementation of appropriate outputs from address decoders and control block 321 to provide signals shown on the lines coming from this block are within matters well within the ordinary level of skill in the art and thus a detailed circuit of the preferred embodiment of these elements is not shown. It is noted that this block responds not only to 16-bit address bus extension 316 but to read and write signals from processor 310 which appear on lines 322 and 325, respectively, and to the address latch enable signal which appears on line 326. A plurality of lines indicated as 327 select particular chips within ROM 22 and RAM 26 in response to decoded addresses on bus 316 in a conventional manner.

Controller 20 communicates with other portions of the machinery of the preferred embodiment via five primary pathways. The first is a serial data link 328 which is provided to the keyboard and display on front panel 85 (FIG. 2).

Secondly, a collection of input signals shown as 329 on FIG. 12 are provided to a type 8259 interrupt controller chip shown as 330. In response to receipt of one or more signals on lines 329, interrupt controller 330 provides an interrupt output on line 331 which is connected to the external interrupt input 332 of processor 310.

The third main communication path is through four lines shown collectively as 335 which are connected to three high speed interrupt inputs on the 8095. Each of the inputs on lines 335 are generated by light choppers of the type shown in FIG. 10. Line 45 carries the output of the light chopper 41 from the transfer belt motor. Line 44 carries the output of the light chopper connected to the photoconductor belt and line 336 carries the output from a light chopper on the scanner motor from the optics bench. Line 343 carries output from the light chopper on paper drive motor 56 (FIG. 4A) Most of the communication functions between controller 20 and driver boards 275 and 276 (FIG. 11) takes place through a serial I/O block which is surrounded by dashed line 338 in FIG. 12.

Lastly, a collection of timing signal outputs are shown collectively as 339 on the right-hand side of FIG. 12. These outputs include pulse width modulated output signals for controlling the speeds of the five motors used in the preferred embodiment, the 15 kilohertz signal for the toner sensor of FIG. 8, which appears on line 227, and other timing signals.

Processor 310 is very busy. As will be apparent from the foregoing description, and the additional description hereinbelow of the functions controlled by the processor, it will be appreciated that the communication scheme shown in FIG. 12 has been adopted in order to maximize the amount of information that controller 20 can handle and generate, and to make sure that top priority routines get serviced first.

To this end, the four high speed interrupts of the 8095 which are connected to lines 335 suit the environment of the present invention particularly well. As is known to those skilled in the art, the high speed interrupts of the type 8095 have a somewhat special configuration. Whenever an interrupt signal is received at one of these pins, the processor immediately (within one clock cycle) latches in a value from an internal clock in the processor indicating the time of occurrence of the interrupt signal. The processor then proceeds to service the interrupt in an otherwise conventional fashion. However, the information about the time of the occurrence of the interrupt remains latched and is used by the processor to precise calculations, since the time of occurrence of the interrupt is known to a high degree of precision. Therefore, the high speed interrupt inputs of this processor are particularly useful in implementing the position servo for the transfer belt, the photoreceptor belt, and the light scanner motor as indicated in FIG. 12.

It should be appreciated from the description of the preferred embodiment to this point that proper synchronization of the photoreceptor belt, the transfer belt and the scanning motor in the optics bench are the critical elements for proper synchronization of the image creation and development components of the print engine of the present invention. Additionally, the paper drive motor must have its speed well regulated during transfer of an image from the transfer belt to a sheet of paper to prevent distortion of the resultant image. Therefore, in the preferred embodiment, the motion transducers, in the form of the light choppers described in connection with FIG. 10, have their outputs connected to these high speed interrupt pins so that the position of these elements may be determined with great accuracy.

Less critical signals which are serviced by interrupt routines of processor 310 are controlled by interrupt controller 330. In the preferred embodiment, this device is implemented with a type 8259A interrupt controller. As is known to those skilled in the art, this interrupt controller will arbitrate the priority of the various interrupts connected to it and provide information to processor 310 about these interrupts. As noted above, the receipt of at least one interrupt signal on one of the input terminals IR0-IR7 of controller 330 causes an interrupt signal to be placed on line 331. An interrupt acknowledge signal (not shown) is provided back from address decoder 321 to interrupt controller 330 in a manner known to those skilled in the art.

In response to the interrupt acknowledge signal, controller 330 places an 8-bit word on its data output lines shown as 340. These lines are directly connected to low order bus extension 320. Processor 310 appropriately disconnects other devices from the bus, and reads the data on lines 340 through bus transceiver 318*b* to determine the interrupt to be serviced. The processor then proceeds to service the interrupt routine. Note that the order of priority for the interrupt signals connected to controller 330 include the mark sense and the home sense signals from the optics bench.

The home sense signal on the optics bench is generated by a sensor which detects the optical scanner returning to a home position. This is used to indicate to digital controller 20 that the optics bench is prepared to start another scan. The mark sense signal is generated by a sensor which is located at a position along the path of the optical scanner which just precedes the point at which the area of the photoreceptor belt which will carry images actually to be transferred onto paper is illuminated by the scanner. This signals the digital controller that scan of an original is about to begin, and alerts the controller to the fact that the optical scanner should have ramped up to a constant speed at the time the mark sense signal is generated.

Next in priority is a signal on line 50 indicating that that the photoconductor index mark has been detected. Similarly, the signal on line 51 is generated when the transfer belt index mark is detected. Lastly, a line sense signal for detecting zero crossings of the 60 Hz AC line signal (for use with the triac controls) and light chopper output from the fuser drive motor, appear on lines 345 and 346, respectively.

The lowest priority interrupt signals to the controller are generated by the receive data ready and the transmit data ready outputs on lines 347 and 348 from a type 8251A UART 349. UART 349 communicates 8-bit parallel words to processor 310 via an extension of the lower order bus 320. Also, read and write signals are provided on lines 350 and 351 in a conventional manner to control the bi-directional flow of data through the UART. As noted above, a serial link 328 is implemented by the transmitted data 31, receive data 30, and data terminal ready (DTR) lines of UART 349. In the preferred embodiment, UART 349 is used to implement an RS-232 port so that other devices may be connected to the print engine.

As will be appreciated by those skilled in the art, serial link 328 is a relatively low traffic communications path since it must only respond to intermittent operation of keys from the keyboard and provide appropriate information to the optics bench about what elements of display 87 (FIG. 2) should be activated to inform the user of the operating status of the machine. The adoption of a serial data link minimizes the number of connections necessary between the print engine of the preferred embodiment and the optics bench. Similarly, relatively low speed data from a laser bench used in constructing an embodiment of the preferred invention may also be communicated through UART 349.

The main timing output signals from controller 20 are shown collectively at 339 in FIG. 12B. These are generated by a pair of type 8254 programmable interval counter currently manufactured by Intel Corporation of Santa Clara, Calif. These devices are programmed through data provided on bus 320 in response to chip select input signals provided on lines 355 and 356. Additionally, the two lowest order address bits from bus 316, which are shown as 357, are used to select particular internal registers of the 8254s when the address of one of them has been decoded by address decoder 321. As noted hereinabove, these devices provide pulse width modulated output signals for controlling the DC motors in the preferred embodiment.

In addition to those already described, the pulse width modulated signal for the scan motor appears on line 358, that for the fuser motor on line 159, and that for the paper drive motor on line 360. Other timing signals provided by programmable interval timers 353 and 354 are represented generally at 361 and 362.

Lastly, serial data is received and transmitted by controller 20 through the bi-directional serial I/O pin 365 from processor 310 labeled RXD. Clocking information for this serial data is provided in response to output on TXD pin 366.

A 4-bit select word is written into register 367 which is embodied by a type 74273 octal D flip-flop circuit. When processor 310 is writing a select word to this device, the device's address is detected by decoder and controller block 321 and a clock signal is provided on line 367 to latch the control word into register 367. When outgoing data is provided, a particular 3-bit word is written onto 3-bit output select bus 368. This bus is connected to two type 74138 3-line to one of eight decoders 369 and 370. The select inputs to decoder 269 are controlled by an RXD output 365 which appears on line 371. The select inputs of decoder 370 are controlled by TXD output 366 which appears on line 372.

Therefore, when processor 310 needs to provide serial data out through pins 365 and 366, it first writes a select word into register 367 which selects the particular one of data output lines 375 and clock output lines 376 which will be activated. It should be understood that these are associated on a one-to-one basis, and therefore when data to a particular one of the other boards or modules of the preferred embodiment is to be provided on one of the data lines, a corresponding clock line is provided to the same device.

An additional 74138 decode (not shown) is connected to an output of latch 367 to provide strobe signals to registers on the other boards connected to lines 375 and 376. These signals latch data from shift registers which receive the serial data.

Only four outputs for each of decoders 369 and 370 are shown. Other decoded outputs include a strobe signal provided to other parts of the preferred embodiment requesting that internal data be provided to the processor about the states of a plurality of switches which indicate whether the various hinged panels and other elements of the machine are properly closed, various switches which determine the level and size of paper in the paper trays, and so forth. When this line has been activated, driver boards 275 and 276 (FIG. 11), through UARTs located on those boards, provide serial data back to serial communications block 338 via internal data line 377.

Line 377 is connected to the three input of a type 74251 eight to one multiplexer 378. When the processor determines that this data is to be read, an appropriate select word is written into register 366 which places a 011 state on select bus 368. This selects the number 3 input, and thus line 377, to be provided to the output of the multiplexer 378 on line 279. Also, the select word written into register 366 provides an appropriate signal on line 380, which is now provided as a part of other select words, to take the multiplexer output on line 379 from its high impedance state to its active state. Therefore, under these conditions, data coming in on line 377 appears as output on line 379 and is in turn provided over line 371 as input to RXD pin 365 of processor 310.

Analog voltages from various transducers in the preferred embodiment are provided along lines 380 and 241 to the inputs of a triple two-to-one type 4053B analog multiplexer 374. The select inputs of this multiplexer are controlled by lines 373 which are connected to the outputs of latch 363. The three output lines 381 from multiplexer 374 are provided to three analog inputs of the type 8095 processor. As should be known to those skilled in the art, this processor includes a plurality of analog input pins with on-board analog to digital conversion apparatus for generating digital words proportional to the analog input voltages. When processor 310 determines that one or more of these voltages is to be converted, an appropriate select word is written onto lower order bus extension 320. Address decoder and controller 321 provides a strobe output on line 364 which latches the select word onto the outputs of latch 363, thus selecting particular ones of lines 241 and 380 to be provided to the processor's analog inputs.

The response of controller to synchronize belts 38, 39 in the preferred embodiment will now be described. It should be understood that as a part of this description, appropriate control signals are also provided to synchronize operation of the scanning motor on the optics bench. However, the essence of the present invention is the print engine itself which, as noted above, may be used with either an optics bench, a laser bench, or another selectively actuable light source which may be used for writing images onto a photoreceptor.

Digital controller 20 implements a digital servo for each of the motors connected to the transfer belt, the photoconductor belt, and the scanner motor. In each of these, information about the current mode or position, and therefore the current position of the device driven by the motor, is provided through the above-described light choppers. The photoconductor belt is nominally thirty-eight inches long with a tolerance of plus or minus 50/1000ths of an inch. Transfer belt is nominally nineteen inches long with a similar tolerance of plus or minus 50/1000ths of an inch. The servo implemented by digital controller 20 regulates belt-to-belt registration within 1.5 mil, or 0.0015 inch. This provides a resultant image on the paper wherein each position on one of the composite images is assured of being at its proper location within a tolerance of 5/1000ths of an inch.

In order to implement this, processor 310, in connection with the other circuitry of controller 20, implements the following functions. First, processor 310 generates a precision 500 kilohertz internal clock that is used in connection with the servo.

It should be understood that teeth 258 on light chopper wheels 256, together with the gearing arrangements between the motors driven and the rollers carrying belts 38 and 39 are spaced such that a passage from a point on one tooth to a point on the next adjacent tooth corresponds to approximately three mils of linear movement of one of the belts. Therefore, something slightly more than 12,600 outputs from photoreceptor belt light chopper 41 are provided during one complete revolution of the 38-inch belt. Approximately half this number are provided when the transfer belt makes one complete revolution.

However, due to the above-referenced mechanical imprecision of the belts themselves, the gears within the motor assemblies, and the compressibility of rubber contained on rollers driving the belts, the exact correlation between movement from a position on a tooth to a position on next adjacent tooth to movement of a particular length of belt cannot be assumed to be a constant from machine to machine, nor can it be assumed to be a constant as the machine operates over a period of time. Therefore, an outer loop to the servo system is executed by a controller 320. It should be noted that in this specification, this servo will be described in connection with photoconductor belt 38. However, a similar program is executed for both transfer belt 39 and the motor on the scanning light of the optics bench.

On every revolution of the photoconductor belt (every other revolution of the transfer belt) a count is maintained of the number of interrupts generated by the associated light chopper. When index mark 251 is detected by optodetector 252 (FIG. 9), this length count is stored and corresponds to the total length of the belt. During execution of the speed control servo, this count is used as representing the total length of the belt. Therefore, it should be apparent that controller 20 acquires a length for the belt expressed in terms of the number of outputs from its associated light chopper.

At this point, it should be noted that the time value stored in response to an interrupt on one of the high-speed interrupt lines 335 is precise enough so that a rough interpolation of a fractional portion of a tooth on the light chopper can be made when the photoconductor belt index mark is detected, as indicated by an interrupt signal on line 255.

In the preferred embodiment, movement of the photoconductor belt is considered the master, and movement of the transfer belt and the light scanner motor are slaved to the photoconductor belt.

The preferred embodiment of the present invention also executes what may be considered an innerloop of a digital servo system. FIG. 13 is a block diagram representing the serve loop wherein digital components basically implement well known analog components of a serve system suggested by the loop structure. It should be understood that in one sense, in FIG. 13 may be considered a rudimentary flow chart for the program running in processor 310 (FIG. 12A) to control the motors.

A precision clock 385 is a 500 kiloHertz clock signal internal to processor 310 which is derived from crystal clock 21 (FIG. 12A). Block 386 represents generation of an interrupt every three milleseconds which is the sampling frequency of the digital servo. Both of these devices are shown as being connected to a 32-bit register 387 internal to processor 310. During execution of the above-referenced outer loop, the controller acquires a count value for the number of interrupts generated on lines 44, 45, and 336 (FIG. 12), for a complete rotation of the belts and scan of the optical scanner. The lengths of these devices are known. Therefore, in order to synchronize the speed of movement of these devices, the digital controller calculates a ticks per unit time equivalent for generating the desired speed of approximately ten inches per second. As used in this statement, a tick refers to a transition on one of lines 335 indicating that a complete cycle from one tooth to an adjacent tooth has been experienced on one of the light chopper wheels.

This result is used to calculate a target position for the belt each three milleseconds. As noted above, this value was loaded into 32-bit register 387. The most significant 16-bits of this register represent the integer number of ticks at the target position and the least significant sixteen bits represent an interpolated fraction of the tick. In practice, only about the most significant four to six bits of this fractional part are used. Block 388 represents a sampling gate indicating that a calculated target position shown on line 389 is provided to adder 390 during each sampling period.

Motor 36 is driving light chopper 40, and this provides a count to a counter in processor 310 represented by counter 391 on FIG. 13. It should be understood that counter 391, as described hereinabove, includes an upper sixteen bits which represent the actual integer number of counts received from light chopper 40 as well as an interpolated fractional part calculated from the stored time of occurrence from the most recent high-speed interrupt generated to the 8095 processor. The output of this counter represents a current belt position and is provided to digital adder 390 on line 392. Naturally, element 390 on FIG. 13 represents a subtraction step performed by processor 310.

As is known to those skilled in the art, the output of adder 390 is an error signal appearing on line 395. This is provided to a digital filter 396 which is also executed in software by processor 310. Digital filtering is provided for stability in a manner directly analogous to the use of an analog loop filter and an analog servo. Therefore, a digital error signal, shown in 397, is the filtered output from filter 396 which is provided as an input on line 398 to a control input for pulse width modulator 353. The pulse width modulator is given the same reference number as the device which implements it, programmable interval timer 353 shown on FIG. 12.

A reset block is shown on FIG. 13 as 399. It should be understood that in a loop controlling the photoconductor belt, reset occurs each time the home position of the belt is detected by an interrupt being generated on line 50 (FIG. 12). The other servo control devices which are slaved to the photoconductor belt receive a reset based on detection of the home position of the photoconductor belt. Therefore, if the transfer belt has lagged slightly behind the photoconductor belt during its most recent revolutions (one revolution of the photoconductor belt), the target position register for the loop controlling the transfer belt is forced to a zero value when zeros are placed in the register of the loop controlling the photoreceptor belt. As will be apparent to those skilled in the art of control systems, this will cause the transfer belt to somewhat abruptly speed up or slow down to try to reach its new target position, assuming that it has either fallen behind or gotten ahead of the photoconductor belt.

As noted above, during image transfer between the two belts, very strong electrostatic forces exist between the two. Therefore, the above-referenced seam areas of each belt are selected as the contact points on the belt wrap, discussed in connection with FIGS. 5 and 6, for the resynchronization of the belts. The corona 198 (FIG. 6) associated with the transfer belt is used to apply an appropriate charge condition to the seam area of the transfer belt. Therefore, when the two seam areas of the belts come in contact, the above-referenced strong electrostatic forces are not present and the transfer belt servo can adjust the position of the transfer belt relative to the photoconductor belt.

From the foregoing it will be appreciated that the use of these servo mechanism is what maintains the proper registration for the composite images recited above. Naturally, in embodiments of the present invention in which the belts are of equal length, such an adjustment would occur for each revolution of the transfer belt rather than every other revolution.

The inventors of the present invention also experimented with a servo system which compensated for slight deviation from the integer sub-multiple relationship with the belt lengths by operating the belts at different speeds, to synchronize the arrival of the seam areas at the belt wrap position. This system was designed to assure that proper registration is maintained near the top of a composite image and that any improper registration resulted in a uniform slight smear as one proceeded down the image along the length of the belt.

While it is believed that embodiments of the present invention may be constructed using this form of control, it is less preferred. In particular, when the transfer belt was moving at a speed slightly less than that of the photoconductor belt, the strong electrostatic forces between the belts from the charged areas were in contact and tended to slow down the photoconductor belt which in turn produced a high error signal trying to cause it to speed up. This was found to create a lack of stability in the system.

Figure 14:
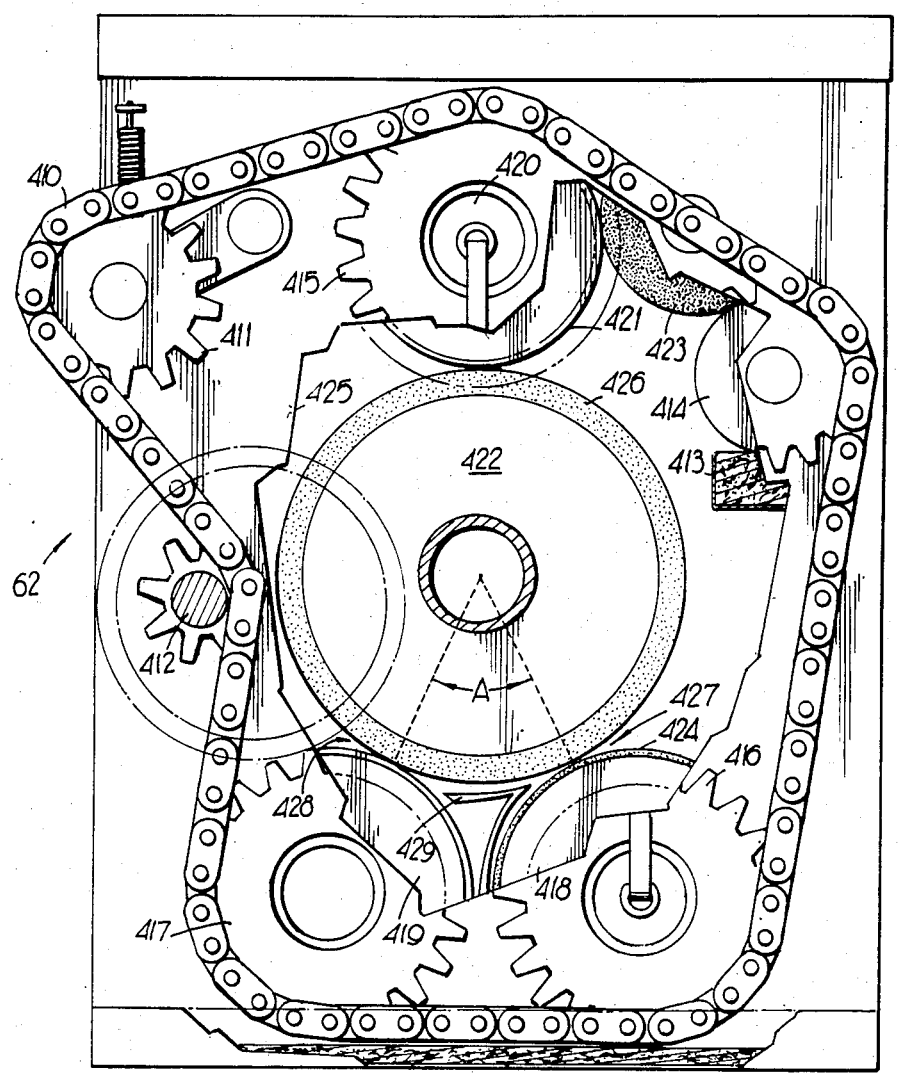
FIG. 14 is a partially cut away side elevation of the improved fuser of the preferred embodiment.

Turning next to FIG. 14, a diagram of the improved fuser of the present invention is shown. The fuser mechanism is driven by a common chain 410. The tension adjustment gear for the chain is shown at 411. Shaft 412 is from the reduction gears connected to motor 65 (not shown in FIG. 14). Gear 415 drives a top heated roller and gears 416 and 417 drive a pair of rollers 418 and 419, respectively. A fuser heater element is shown as 420 within top roller 421. Heat from roller 421 is transferred to compressible heated roller 422 within the interior of the fuser mechanism which may be seen because a portion of the outer view of the fuser mechanism in FIG. 14 is shown as broken away at line 425. Roller 422 has a rubberized compressible surface 426 which is indirectly heated by roller 421.

An oil pad 413 is periodically lifted to contact roller 414 to provide silicone oil. This oil is transferred via roller 423 to the other rollers within the fuser.

As noted hereinabove, the improved fuser of the present invention provides increased dwell time of the image receptor or paper within the fuser. This is accomplished by using a pair of rollers 418 and 419 where prior art fusers have uniformly used a single roller. The outer surface 424 of first compression roller 418 is covered with material having a greater compressibility than that of surface 426 of heated roller 422. This prevents paper from tending to be peeled away from heated roller 422 as it proceeds from its entrance point to the fuser at 427 to its exit point 428. Plastic deflector 429 is included within the fuser to catch a leading edge of a sheet of paper which may tend to become separated from heated roller 422 and guide the sheet onto the junction between compression roller 419 and heated roller 422. From the foregoing it will be appreciated that the paper is in contact with heated roller 422 for the entire arc length of an angle indicated as A in FIG. 14. This provides a much greater dwell time for the copy within the fuser than that achieved by prior art fusers in which the dwell time was limited to the time the sheet of paper was compressed between a heated roller such as 422 and a compression roller such as either roller 418 or 419.

Figure 14A:
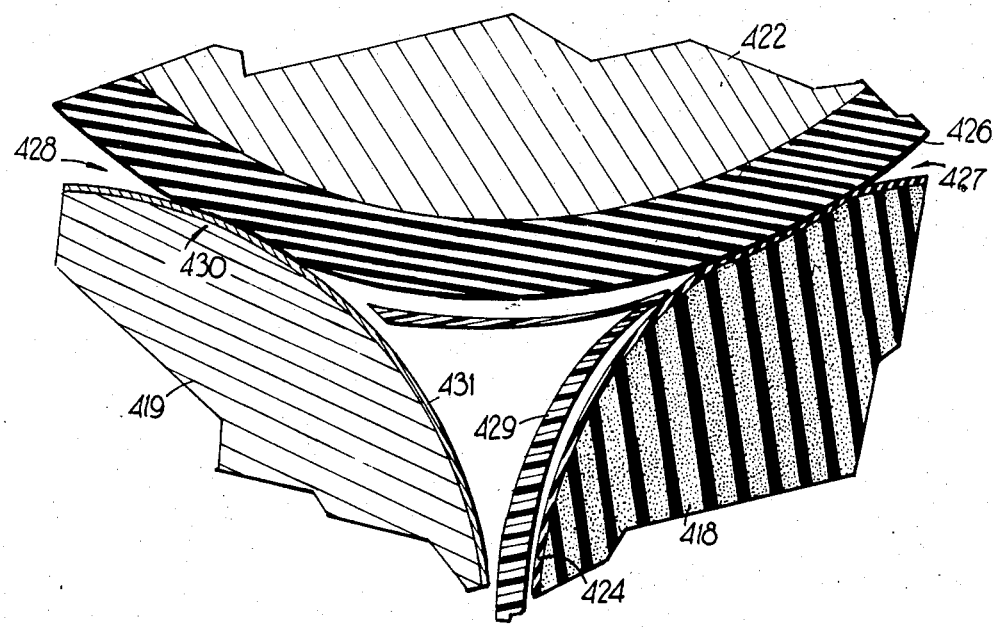
FIG. 14A is a detail drawing showing the contact areas between various rollers in the fuser of FIG. 14.

FIG. 14A is a detail drawing showing the paper contact area among rollers 418, 419 and 422 of the fuser shown in FIG. 14. As noted above, the relative compressibilities of the surfaces of these rollers is an important design feature of the improved fuser of the present invention in order to prevent paper from becoming separated from surface 426 of roller 422 as it travels between rollers 418 and 419. In ascending order of compressibility of their surfaces, the rollers are 419, 422, followed by 418. Roller 418 is constructed of foam rubber in the preferred embodiment, with its outer coating 426 being formed of a smooth rubber. Heated roller 422 has an outer coating of a harder rubber.

Sheet-like material passing between heated rollers of different compressibilities will tend to cling to the contour of the roller which is less compressible, and thus has an outer surface which most closely approximates retention of its arcuate shape. Therefore, when paper enters the area at 427 between surfaces 426 and 424, it tends to cling to surface 426 as roller 422 rotates clockwise, since surface 426 is harder and less compressed than surface 424.

After passing deflection finger 429, the edge of the paper enters the area, shown at 430, between surface 426 of roller 422 and surface 431 of roller 419. In the preferred embodiment, roller 419 is constructed of aluminum with an outer surface 431 consisting of a coating of Teflon. Since the aluminum and Teflon roller 419 is harder than the rubberized surface 426 of roller 422, surface 426 is deformed more greatly than surface 431. This causes the paper to tend to follow surface 431 of roller 419 as it exits the fuser mechanism and therefore to peel away from heated roller 422 so that it does not jam within the fuser. Therefore, the improved fuser of the present invention meets the above-stated object of the invention of providing increased dwell time at a given speed of operation.

Additionally, the digital controller 20 shown in FIG. 12, receives a signal over internal data link 377 when a copying sequence is about to begin. The fuser of FIG. 14 is equipped with conventional temperature detectors for monitoring the temperature of the fuser. Heater element 420 is activated under the control of digital controller 20 (FIG. 1) when the temperature becomes too low. Whenever the fuser heater is on, a scanner enable signal from digital controller 20 is placed in a condition in which it will prevent operation of the lamps and prevent the beginning of an optical scan until the fuser has reached an appropriate temperature. Similarly, when a scan is in progress, digital controller 20 will not turn on heater element 420 to elevate the fuser temperature until the scan is completed. Since the fuser heater element 420 and the two above-referenced 400 watt lamps used in the optical bench are the devices which drawn the most current in the preferred embodiment, it will be appreciated that the preferred embodiment can be operated safely and dependably off a conventional 15-ampere 120-volt branch circuit without overloading same.

Figure 15:
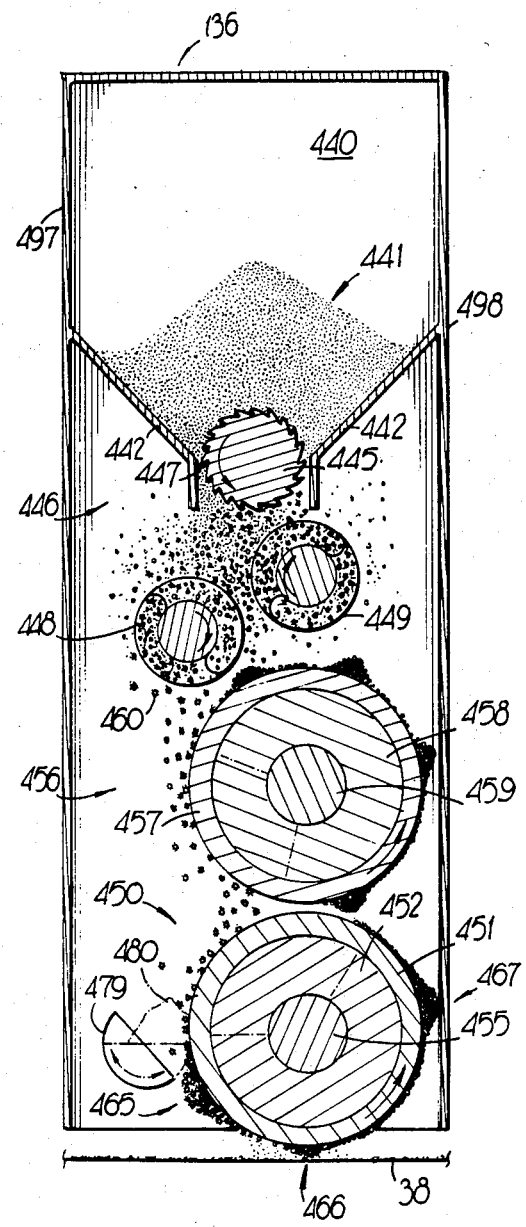
FIG. 15 is a section view of a first preferred embodiment of the toner deposition modules of the present invention.

Two embodiments of the improved toner modules 136 are shown in FIGS. 15-18. FIG. 15 shows a first embodiment of the improved downwardly facing gravity fed toner module. FIGS. 15-18 are cross-sectional views of what one would see when facing the modules in the views of FIGS. 5 and 6.

A hopper 440 holds a supply of plastic toner materials 441. The bottom of the hopper has downwardly sloped edges 442 which guide the toner particles. A ratcheting toothed shaft 445 is indexed each time the digital controller detects a condition of low toner in a mixing chamber 446. A plurality of teeth 447 around the surface of shaft 445 introduce a predetermined amount of toner material into the mixing chamber each time the shaft is indexed.

A pair of mixing augers 448 and 449 move the mixed combination of toner material and ferromagnetic carrier longitudinally within the mixing chamber. The pitch and direction of rotation of augers 448 and 449 are selected so that one moves material into the page and one moves material out of the page in the view of FIG. 15.

A decorator roller of substantially conventional construction is shown at 450. This roller includes a rotating aluminum sleeve 451 which is driven about a stationary magnetic core 452 having a non-magnetic inner section 455. One of the novel aspects of the toner deposition apparatus of FIG. 15 is the inclusion of mixing roller 456. Mixing roller 456 also has a rotating outer aluminum sleeve 457 and a magnetic core 458 with a non-magnetized inner section 459. Each of rollers 450 and 456 rotate counterclockwise as seen in FIG. 15. Therefore, the left-hand sides of these rollers, as viewed in the figures, are downwardly traveling and the right side of these rollers are upwardly traveling. Within the mixing chamber, the smaller stippling dots represent toner material 441 and the larger dots, such as 460 show ferromagnetic carrier particles.

Figures 17, 18A, 18B:
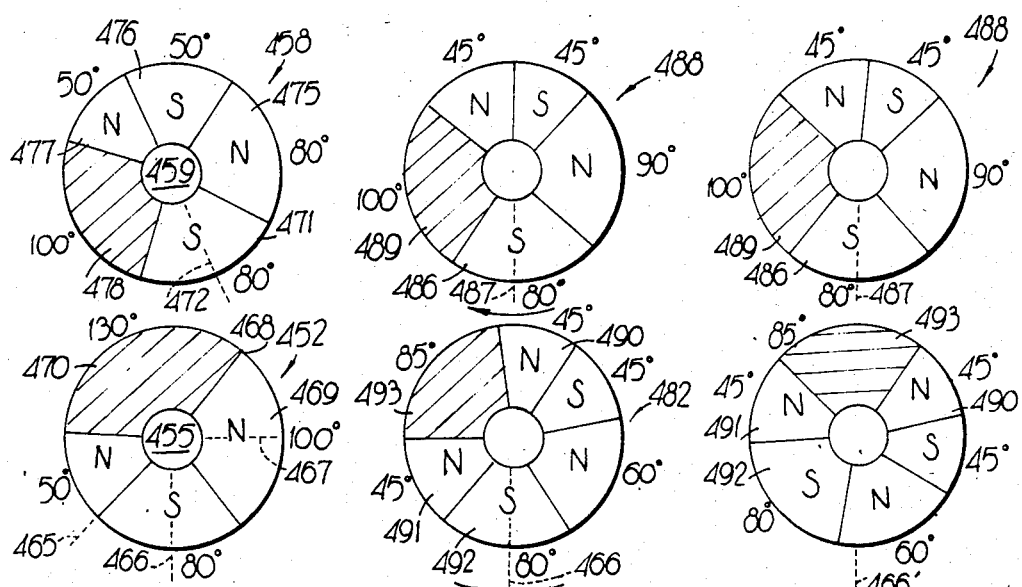
FIG. 17 is a diagram representing in cross-section, the magnetic pole orientation for the cores of the decorator roller and the mixing roller of the embodiment of FIG. 15.
FIG. 18A is a diagram representing, in cross-section, the magnetic pole orientation of the cores of the decorator roller and mixing roller of the embodiment of FIG. 16 when in the open position.
FIG. 18B is a diagram representing, in cross-section, the magnetic pole orientation of the cores of the decorator roller and mixing roller of the embodiment of FIG. 16 when in the closed position.

The pole orientations for magnetic cores 458 and 452 are shown in FIG. 17. As is known to those skilled in the art, decorator rollers such as roller 450 are arranged to have a relatively smooth outer sleeve, usually constructed of aluminum, rotating around a magnetized core having radially spaced magnetic poles of differing polarity. Because of the magnetic field generated by the core, the carrier particles tend to cling to the outer sleeve. As rotation of the outer sleeve carries the mixture over a portion of the magnetic core which lies between two poles of opposite polarity, such as position 465 shown in FIG. 17, the flux lines of the magnetic field tend to be tangential to the outer surface of the core, and thus to the surface of the aluminum roller. This causes the mixture to tend to lay down.

As the particles move from this portion of the magnetic field to a position where they are at the center point of a pole of particular polarity, such as point 466 shown in FIG. 17, the particles tend to become aligned with the field, and thus form a brush which will stand away from the surface of the decorator roll and contact photoreceptor belt 38. This phenomenon is illustrated in FIG. 15 at corresponding locations 465 and 466 on the outer surface of decorator roller 450.

As is known to those skilled in the art, this phenomenon occurs because the ferromagnetic carrier particles are normally chosen to be somewhat elongated. Therefore, in the presence of a magnetic field, induced magnetic dipoles form within these particles along their longest dimension. Therefore, the elongated particles tend to stand up when in the presence of a magnetic field for which the magnetic flux or field intensity vector is pointing radially from the center of the decorator roller, and tend to lay down next to the roller when the magnetic flux vector has a strong tangential component. In the preferred embodiment, the pole pieces used provide a magnetic field intensity of approximately 6000 gauss.

As may be seen in FIG. 15, the brush of particles contacts photoreceptor belt 38 at location 466. The portions of the surface of belt 38 carrying a high positive electrostatic potential will draw the particles on to them in a conventional manner.

As particles which remain on the surface of aluminum sleeve 451 are carried upward, they next pass a centerline 467 of a north pole within core 452. This corresponds to location 467 shown in FIGS. 15 and 17. Therefore, another brush of particles is formed within the interior of module 136. As described hereinabove, the radial component of the magnetic field is at its strongest at location 467, as it is at location 466, and the brush formed helps keep particles from falling back under decorator roller 450.

As the particles continue to proceed around the upwardly traveling edge of sleeve 450, they approach point 468 (FIG. 17) between the north pole section 469 and an unmagnetized portion of the core 470. This portion of the surface of decorator roller 450 lays under the center of a south pole segment 471 of mixing roller 458, the center of which is shown as 472 in FIG. 17. Therefore, the particles ascending on the right side of decorator roller 450 enter an area of very weak magnetic field from core 452, and are pulled by the strong field of south pole segment 471 of core 458 so that they become magnetically adhered to rotating aluminum sleeve 457 of mixing roller 456. The particles are thereby lifted up into the mixing chamber and further agitated, by alternately laying down and standing up, as they pass over magnetic pole pieces 475–477 shown in FIG. 17.

Auger 448, is positioned with respect to aluminum sleeve 457, so that it pulls a significant portion of the particles away from surface 457 for mixing in mixing chamber 446, as described hereinabove. Note that auger 448 is positioned so that it is approximately centered over north pole segment 477 and thus the particles will tend to be standing when they pass under the auger. Those particles not pushed along by auger 448 will continue on to be downward traveling left-hand side of mixer roller 456. As may be seen in FIG. 17, they then pass over a non-magnetized portion 478 of core 458. Thus, in response to gravity, some of the particles fall downward onto the surface of aluminum sleeve 451.

In the first preferred embodiment of FIG. 15, a selectively rotatable doctor blade 479 is employed. The doctor blade, as shown in FIG. 15, is in the open position which allows particles to pass to and form the brush at 466, described hereinabove. When the doctor blade is rotated to its closed position, shown in phantom in FIG. 15, it scrapes particles away from the surface of aluminum sleeve 451 and they tend to collect in a pile, shown in phantom at 480 in FIG. 15. Doctor blade 479 is selectively rotated between two stopped positions by the use of a solenoid in the preferred embodiment.

The extent of angular rotation of doctor blade 479 in the open position is selected so that it is approximately three millimeters away from the surface of aluminum sleeve 451 when in the open position. This allows an adequate thickness of particles to adhere to the surface of the decorator roller and pass down to form a brush at 466, without dropping the accumulated pile 480 onto photoreceptor belt 438.

As noted hereinabove, the use of a downward facing gravity-fed toner module provides a system which is less susceptible to contamination when a condition of carrier pull from another module exists within the machine. If it is assumed that an adjacent toner module is active, and a condition of very high charge on the surface of belt 38 has caused carrier pull to occur from the other module, doctor blade 478 will be in its closed position and therefore the portion of surface 451 at point 466 will be free of particles. As the pile of particles, which includes carrier particles and toner which are not strongly electrostatically attached to belt 38 passes under the module of FIG. 15, the only way contamination can occur is for sufficient magnetic attraction to exist between the carrier particles laying on the surface of the belt and decorator roller 450. In conventional systems, particles laying on the surface of a belt after a carrier pull tend to be shaken off and to fall into other toner modules which are facing upward, thus contaminating the color of the toner.

The inventors of the present invention have found that the downward facing module does not cause the expected problems of toner falling onto the surface of photoreceptor belt 38 when toner deposition is not desired.

Furthermore, the use of the novel mixing roller 456 is advantageous in that it requires no augers for lifting toner and carrier particles onto the surface of a decorator roller as is done in prior art color copying systems. Mixing augers 448 and 449 are the only augers used within these toner modules.

Figure 16:
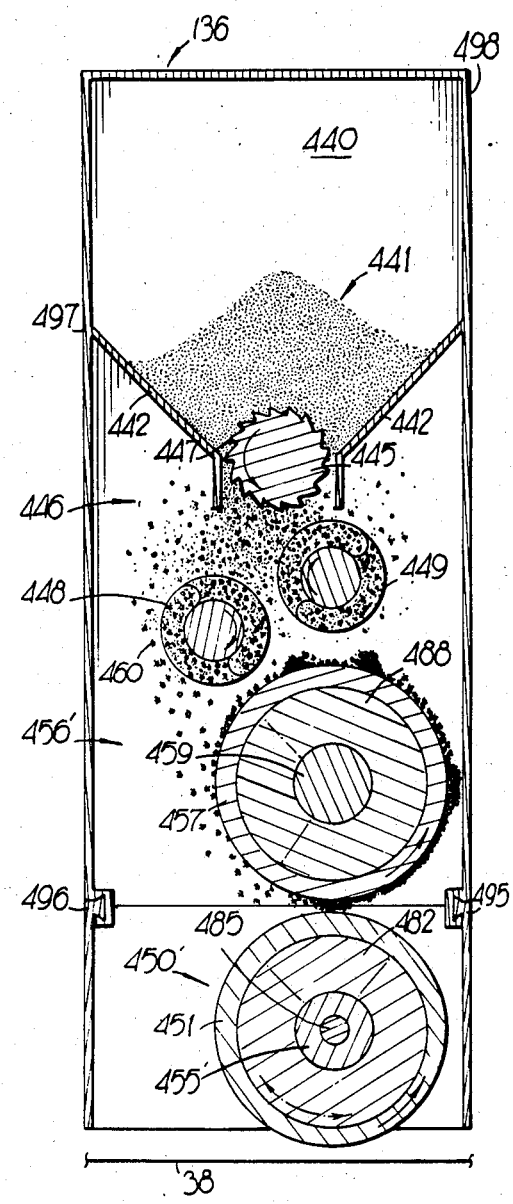
FIG. 16 is a section view of an alternate preferred embodiment of the toner deposition modules of the present invention.

A second embodiment of an improved downwardly facing gravity-fed toner module is shown in FIG. 16. In FIG. 16, all like parts to the module of FIG. 15 are referenced with the same numerals. The mixing roller is shown as 456' to indicate that it serves substantially the same function, but has a different structure, than mixing roller 456 of the embodiment of FIG. 15.

Similarly, decorator roller 450' of the embodiment of FIG. 16 has a different internal structure than decorator roller 450 of the embodiment of FIG. 15. Aluminum sleeves 451 and 457 are of the same type as those bearing the same reference numerals in the embodiment of FIG. 15.

The magnetic pole orientation of magnetic cores 482 and 488 in FIG. 16 are shown in FIGS. 18A and 18B. In the embodiment of FIG. 16, magnetic core 482 of the decorator roller includes a non-magnetized inner section 455' to which it is securely fixed. Passing to the center of the magnetic core is a shaft 485 which may be rotated between two stopped positions by a solenoid (not shown) to rotate the magnetic core.

The magnetic pole orientation of core 488 is shown in FIGS. 18A and 18B. It includes a downwardly facing 80° C. south pole segment 486 which is approximately centered at 487. As one proceeds in the direction of rotation of sleeve 457 (counterclockwise), alternate north and south poles are encountered until non-magnetized portion 489 is reached.

The combination of the selection of magnetic pole orientation for core 482 and the angle through which it is rotated between the open and closed positions shown in FIGS. 18A and 18B, respectively, form a magnetic gate for toner and carrier particles in the embodiment of FIG. 16. First, consider the orientation of core 482 in the open position shown in FIG. 18A. In this configuration, as particles reach the lower portion of the unmagnetized section 489 of core 488, they tend to be drawn off the surface of sleeve 457 under the influence of gravity and magnetic dipole formed between south pole segment 486 of core 488 and north pole segment 490 of core 482. The particles then move downwardly over unmagnetized segment 493 on aluminum sleeve 451, over north pole segment 491 and south pole segment 492. A brush is formed at 466 as was the case with the embodiment of FIG. 15 when the magnetic gate formed by core 482 is in its open position.

Next, assume that this particular toner module is no longer active and the gate closes. This is the condition represented in FIG. 16 and shown in FIG. 18B. Contrasting FIGS. 18A and 18B, it may be seen that magnetic core 482 has been rotated approximately 45° counterclockwise. When this occurs, the magnetic gate is shut, as may be appreciated from viewing FIG. 18B and FIG. 16 which shows the gate in a closed configuration.

In the closed position, unmagnetized section 493 of core 482 is moved under position 487, which is the approximate center of a south pole segment of core 488. Therefore, no strong flux vector is aligned between the lower descending side of sleeve 457 and core 482. The strongest local magnetic field which remains is the influence of south pole segment 486 and thus the particles remain adhered to the surface of aluminum sleeve 457. They tend to stand up and form a brush as they pass over position 487 since this is near the center of south pole segment 486. However, particles standing up at this position are directly over, and possibly in contact with, unmagnetized segment 493 of core 482, and therefore the particles remain adhered to the surface of aluminum sleeve 457.

Also, as particles are lifted on the rising side of sleeve 451 of the decorator roller, they pass over north pole segment 490 and onto an area over unmagnetized core segment 493 which lies directly under south pole segment 486 of the upper core 488. Therefore, the particles are drawn off the surface of sleeve 451 and onto the surface of sleeve 457. Thus, as particles are raised by the right-hand ascending side of sleeve 451, immediately after the toner module is deactivated, they are transferred to the surface of mixer roller 456' when the gate is shut.

It is believed by the inventors of the present invention that even additional advantages may be obtained by constructing embodiments of the present invention in which both cores 482 and 488 are rotated when the gate is in the closed position.

In addition to magnetically closing a gate, so that particles remain adhered to mixer roller 456', the embodiment of FIG. 16 provides the additional benefit of increased immunity from contamination. Consider again the example of a condition of carrier pull from an upstream toner module. From inspection of FIG. 18B, it will be appreciated that at position 466', the position lying closest to photoreceptor belt 38, the magnetic field orientation is almost purely tangential. Therefore, there is very little tendency to pull any carrier particles laying on belt 38 onto the surface of the decorator roller.

The preferred embodiment of the present invention uses three distinct implementations of the toner modules of the preferred embodiment. The first is that shown in FIG. 15 which is designed to be entirely disposable. Sufficient carrier particles are retained within mixing chamber 466 to make approximately 7,000 copies. Similarly, hopper 440 contains sufficient toner materials to make the 7,000 copies. When this supply is exhausted, the entire module is removed from the machine, thrown away, and replaced with a similar module. Therefore, it is preferred to use the embodiment having doctor blade 497 for the completely disposable module because same is easier and cheaper to fabricate than the rotating magnetic core 482 of the embodiment of FIG. 16.

FIG. 16 represents a second embodiment in which the decorator roller is embodied as a permanent part of the print engine, and the section above a joint shown at 495 and 496 is disposable. The preferred form of this arrangement is to include within the mixing chamber sufficient carrier particles to make 21,000 copies, and a similarly proportioned amount of toner material 441.

An alternate arrangement has also been designed in which additional removable joints (not shown) are provided at 497 and 498 so that the hoppers 440 carrying toner materials are user replaceable and disposable. The preferred form of this arrangement is to have the middle segment of the toner module containing the mixing chamber and mixing roller 456 or 456' be removable, but not necessarily user replaceable. In this arrangement, sufficient carrier particles for 21,000 copies are included within the mixing chamber and individual hoppers 440, which are user replaceable, are supplied with sufficient toner for 7,000 copies. Therefore, the user will be able to make three replacements of the toner supply hopper and 21,000 copies before requiring service to clean the mixing chamber and replace the carrier particles.

From the foregoing description of the preferred embodiment, and several alternative embodiments, it will be appreciated that the present invention overcomes the drawbacks of the prior art and meets the objects of the invention cited hereinabove. In view of the teachings of this specification, other alternative embodiments will suggest themselves to those skilled in the art and therefore the scope of the present invention is to be limited only by the claims below.

We claim:

1. Gravity-fed toner module apparatus for applying toner to an electrostatically charged receptor belt for use in an electrophotographic machine comprising:
   a toner hopper for holding said toner, having a bottom and an opening in said bottom;
   toner feed means, positioned at least partially within said opening, for selectably allowing a predetermined amount of said toner to fall from said opening;
   mixing means, positioned below said opening, for receiving said toner from said opening, providing a mixture by mixing said toner with a plurality of magnetic carrier particles, and allowing said mixture to fall from said mixing means;
   first means, positioned at least partly below said mixing means, for magnetically directing said mixture falling from said mixing means in a predetermined direction, and for returning an unused portion of said mixture to said mixing means; and
   second means, positioned at least partially below said first means, for receiving said mixture magnetically directed by said first means, bringing said mixture into close proximity with said receptor belt whereby a portion of said toner in said mixture is electrostatically transferred from said second means to said charged receptor belt, and returning said magnetic carrier particles in said mixture and remaining portions of said toner in said mixture to said first means as said unused portion of said mixture.

2. The toner module apparatus of claim 1 wherein said first means comprises:
   a first cylinder having a first plurality of elongate first magnetic poles and an elongate, first nonmagnetic area between a first predetermined two of said first magnetic poles; and
   a first nonmagnetic sleeve enclosing and rotating around said first cylinder;
   whereby said mixture is magnetically bound to said first sleeve by said first magnetic poles when said mixture is near said first magnetic poles, extends radially from said first sleeve when said mixture is over a center of one of said first magnetic poles, lies against said first sleeve when said mixture is over an edge of one of said first magnetic poles, and falls from said first sleeve when said mixture is over said first nonmagnetic area.

3. The toner module of claim 2 wherein at least one of said first magnetic poles causes said mixture falling from said mixing means to move in said predetermined direction.

4. The toner module of claim 3 wherein said predetermined direction is toward said second means.

5. The toner module apparatus of claim 2 wherein said second means comprises:
   a second cylinder having a second plurality of elongate second magnetic poles and an elongate second nonmagnetic area between a second predetermined two of said second magnetic poles; and
   a second, nonmagnetic sleeve enclosing and rotating around said first cylinder;
   whereby said mixture is magnetically bound to said second sleeve by said second magnetic poles when said mixture is near said second magnetic poles, extends radially from said second sleeve when said mixture over a center of one of said second magnetic poles, lies flat against said second sleeve when said mixture is over an edge of one of said second magnetic poles, and is magnetically transferred from said second sleeve to said first sleeve as said mixture moves from said second magnetic poles toward said second nonmagnetic area.

6. The toner module apparatus of claim 5 wherein said second cylinder is stationary.

7. The toner module apparatus of claim 5 wherein said second cylinder is selectably rotated into a first position whereby a center of a predetermined one of said second magnetic poles is approximately directly over said receptor belt and, alternately, into a second position whereby an edge of said predetermined one of said second magnetic poles is approximately directly over said receptor belt.

8. Magnetic gate apparatus for use in a downward-facing toner module for applying a toner to an electrostatically-charged receptor belt, said toner module having a toner hopper, toner feed means, a plurality of magnetic carrier particles, and mixing means for providing a mixture by mixing said toner with said magnetic carrier particles; said magnetic gate apparatus comprising:
   first means, positioned at least partly below said mixing means, for magnetically directing said mixture falling from said mixing means in a predetermined direction, and for returning an unused portion of said mixture to said mixing means; and
   second means, positioned at least partially below said first means, for receiving said mixture magnetically directed by said first means, bringing said mixture into close proximity with said receptor belt whereby a portion of said toner in said mixture is electrostatically transferred from said second means to said charged receptor belt, and returning said magnetic carrier particles in said mixture and remaining portions of said toner in said mixture to said first means as said unused portion of said mixture.

9. The magnetic gate apparatus of claim 8 wherein said first means comprises:
   a first cylinder having a first plurality of elongate first magnetic poles and an elongate, first nonmagnetic area between a first predetermined two of said first magnetic poles; and a first nonmagnetic sleeve enclosing and rotating around said first cylinder;

whereby said mixture is magnetically bound to said first sleeve by said first magnetic poles when said mixture is near said first magnetic poles, extends radially from said first sleeve when said mixture is over a center of one of said first magnetic poles, lies against said first sleeve when said mixture is over an edge of one of said first magnetic poles, and falls from said first sleeve when said mixture is over said first nonmagnetic area.

10. The magnetic gate apparatus of claim 9 wherein at least one of said first magnetic poles causes said mixture falling from said mixing means to move in said predetermined direction.

11. The magnetic gate apparatus of claim 10 wherein said predetermined direction is toward said second means.

12. The magnetic gate apparatus of claim 25 wherein said second means comprises:

a second cylinder having a second plurality of elongate second magnetic poles and an elongate second nonmagnetic area between a second predetermined two of said second magnetic poles; and a second, nonmagnetic sleeve enclosing and rotating around said first cylinder;

whereby said mixture is magnetically bound to said second sleeve by said second magnetic poles when said mixture is near said second magnetic poles, extends radially from said second sleeve when said mixture over a center of one of said second magnetic poles, lies flat against said second sleeve when said mixture is over an edge of one of said second magnetic poles, and is magnetically transferred from said second sleeve to said first sleeve as said mixture moves from said second magnetic poles toward said second nonmagnetic area.

13. The magnetic gate apparatus of claim 12 wherein said second cylinder is stationary.

14. The magnetic gate apparatus of claim 12 wherein said second cylinder is selectably rotated into a first position whereby a center of a predetermined one of said second magnetic poles is approximately directly over said receptor belt and, alternately, into a second position whereby an edge of said predetermined one of said second magnetic poles is approximately directly over said receptor belt.

* * * * *